United States Patent
Takahashi

(10) Patent No.: US 11,425,318 B2
(45) Date of Patent: Aug. 23, 2022

(54) SENSOR AND CONTROL METHOD

(71) Applicant: Sony Semiconductor Solutions Corporation, Kanagawa (JP)

(72) Inventor: Hirotsugu Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/279,851

(22) PCT Filed: Oct. 16, 2019

(86) PCT No.: PCT/JP2019/040576
§ 371 (c)(1),
(2) Date: Mar. 25, 2021

(87) PCT Pub. No.: WO2020/090460
PCT Pub. Date: May 7, 2020

(65) Prior Publication Data
US 2022/0038645 A1    Feb. 3, 2022

(30) Foreign Application Priority Data

Oct. 30, 2018    (JP) .............................. JP2018-203439

(51) Int. Cl.
*H04N 5/347*    (2011.01)
*H04N 5/3745*    (2011.01)

(52) U.S. Cl.
CPC ........... *H04N 5/347* (2013.01); *H04N 5/3745* (2013.01)

(58) Field of Classification Search
CPC ...... H04N 5/347; H04N 5/3745; H04N 3/155; H04N 5/3454; H04N 5/3559;
(Continued)

(56) References Cited

U.S. PATENT DOCUMENTS

| | | | |
|---|---|---|---|
| 2008/0084341 A1* | 4/2008 | Boemler | H04N 5/347 348/E9.01 |
| 2012/0061568 A1 | 3/2012 | Lee et al. | |

(Continued)

FOREIGN PATENT DOCUMENTS

| | | |
|---|---|---|
| JP | 2016-019079 A | 2/2016 |
| JP | 2017-535999 A | 11/2017 |
| WO | 2017/013806 A1 | 1/2017 |

OTHER PUBLICATIONS

Extended European Search Report dated Nov. 15, 2021 for corresponding European Application No. 197879171.7.
(Continued)

*Primary Examiner* — Amy R Hsu
(74) *Attorney, Agent, or Firm* — Michael Best & Friedrich LLP

(57) ABSTRACT

The present technology relates to a sensor and a control method that achieve flexible acquisition of event data.
A pixel block of the sensor includes one or more pixels each configured to receive light and perform photoelectric conversion to generate an electrical signal and an event detecting section configured to detect an event that is a change in electrical signal of each of the pixels. The sensor switches connections between a plurality of the pixel blocks. The present technology is applicable to a sensor configured to detect events that are changes in electrical signal of pixels, for example.

7 Claims, 34 Drawing Sheets

(58) Field of Classification Search
CPC .......... H04N 5/37452; H04N 5/37455; H04N 5/37457; H04N 5/378; H04N 9/0455; G06F 3/017; G06T 2200/28; G06T 7/254; G06V 40/20; H01L 27/146; H01L 27/14603; H01L 27/14612; H01L 27/14616; H01L 27/14621; H01L 27/14636; H01L 27/14638; H01L 27/14645; H01L 27/14812

See application file for complete search history.

(56) References Cited

U.S. PATENT DOCUMENTS

| | | | | |
|---|---|---|---|---|
| 2016/0005788 A1* | 1/2016 | Ogura | ............... | H01L 27/14636 348/308 |
| 2016/0133668 A1* | 5/2016 | Rothberg | ........... | G01N 21/6458 250/206 |
| 2017/0302866 A1 | 10/2017 | Fu et al. | | |
| 2018/0167575 A1* | 6/2018 | Watanabe | ............ | H04N 5/3745 |
| 2020/0358977 A1* | 11/2020 | Niwa | ................ | H01L 27/14609 |

OTHER PUBLICATIONS

International Search Report (PCT/ISA/210), International Application No. PCT/JP2019/040576, dated Dec. 12, 2019.

Notification of Transmittal of the International Search Report and the Written Opinion of the International Searching Authority, or the Declaration (PCT/ISA/220), International Application No. PCT/JP2019/040576, dated Dec. 24, 2019.

Written Opinion of the International Search Authority (PCT/ISA/237), International Application No. PCT/JP2019/040576, dated Dec. 24, 2019.

* cited by examiner

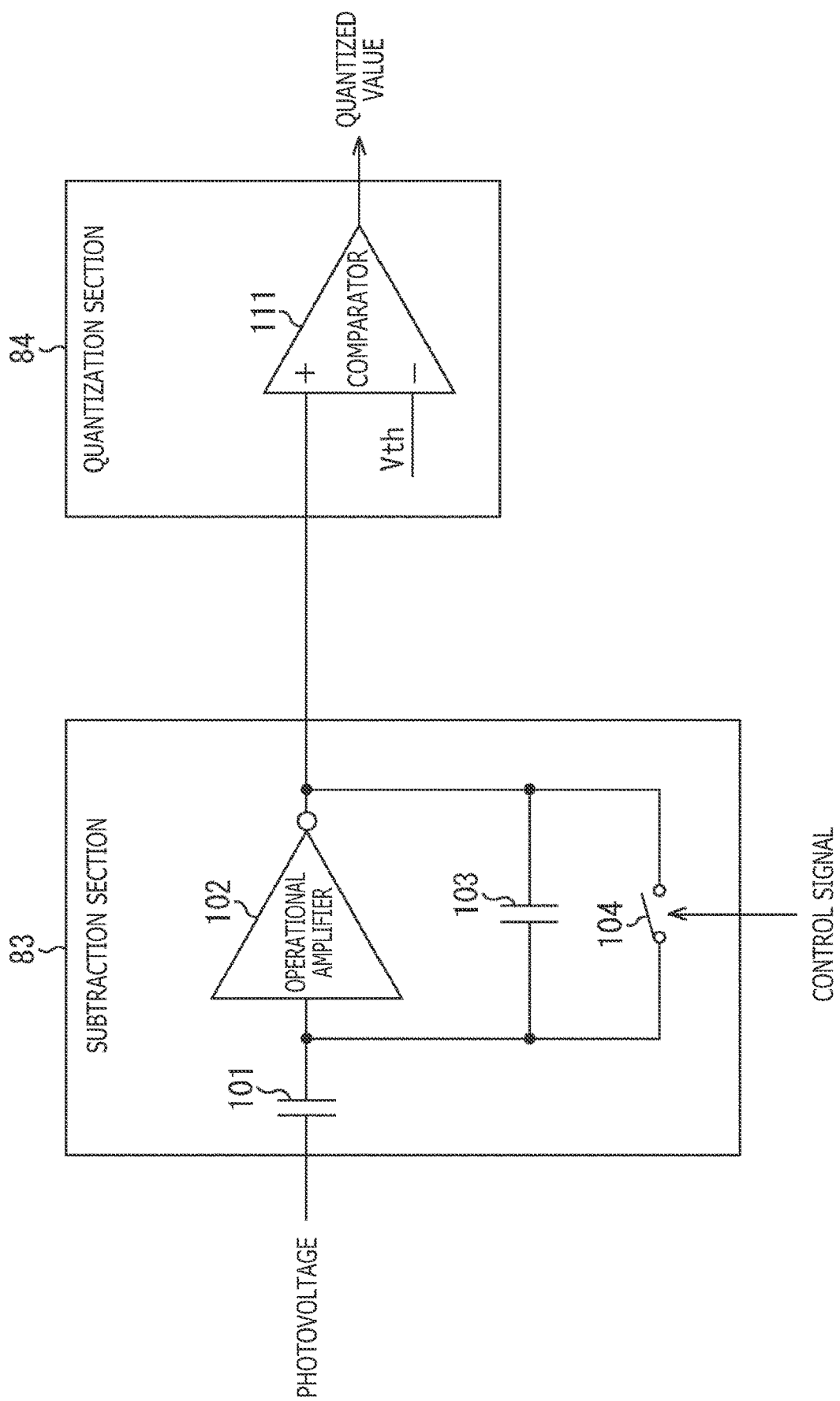
F I G. 7

FIG. 19

| OPERATING MODE | FET231 | TRANSISTOR 92 OF EVENT DETECTING SECTION 52B | CALCULATION |
|---|---|---|---|
| HIGH RESOLUTION (NORMAL) MODE | off | on | CALCULATION TABLE TL1 |
| LOW RESOLUTION MODE | on | off | CALCULATION TABLE TL2 |
| AVERAGE CURRENT MODE | on | on | CALCULATION TABLE TL3 |

FIG. 20

| | α | β | α' | β' |
|---|---|---|---|---|
| TL3 | +1 | +1 | +1 | 0 |
| | +1 | 0 | 0 | 0 |
| | +1 | -1 | 0 | 0 |
| | 0 | +1 | 0 | 0 |
| | 0 | 0 | 0 | 0 |
| | 0 | -1 | 0 | 0 |
| | -1 | +1 | 0 | 0 |
| | -1 | 0 | -1 | 0 |
| | -1 | -1 | -1 | 0 |

C

| | α | β | α' | β' |
|---|---|---|---|---|
| TL2 | +1 | +1 | +1 | 0 |
| | +1 | 0 | +1 | 0 |
| | +1 | -1 | +1 | 0 |
| | 0 | +1 | 0 | 0 |
| | 0 | 0 | 0 | 0 |
| | 0 | -1 | 0 | 0 |
| | -1 | +1 | -1 | 0 |
| | -1 | 0 | -1 | 0 |
| | -1 | -1 | -1 | 0 |

B

| | α | β | α' | β' |
|---|---|---|---|---|
| TL1 | +1 | +1 | +1 | +1 |
| | +1 | 0 | +1 | 0 |
| | +1 | -1 | +1 | -1 |
| | 0 | +1 | 0 | +1 |
| | 0 | 0 | 0 | 0 |
| | 0 | -1 | 0 | -1 |
| | -1 | +1 | -1 | +1 |
| | -1 | 0 | -1 | 0 |
| | -1 | -1 | -1 | -1 |

A

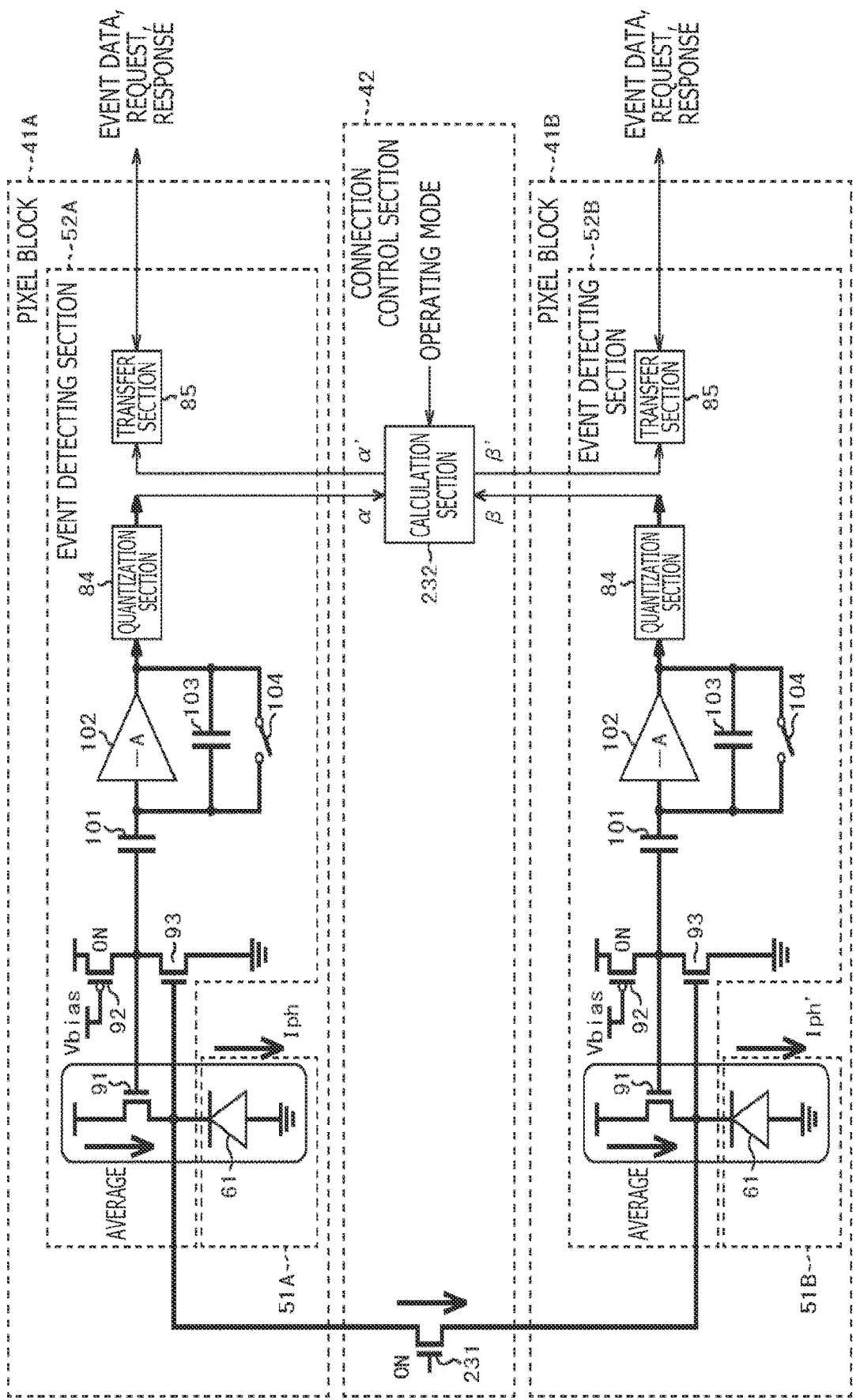

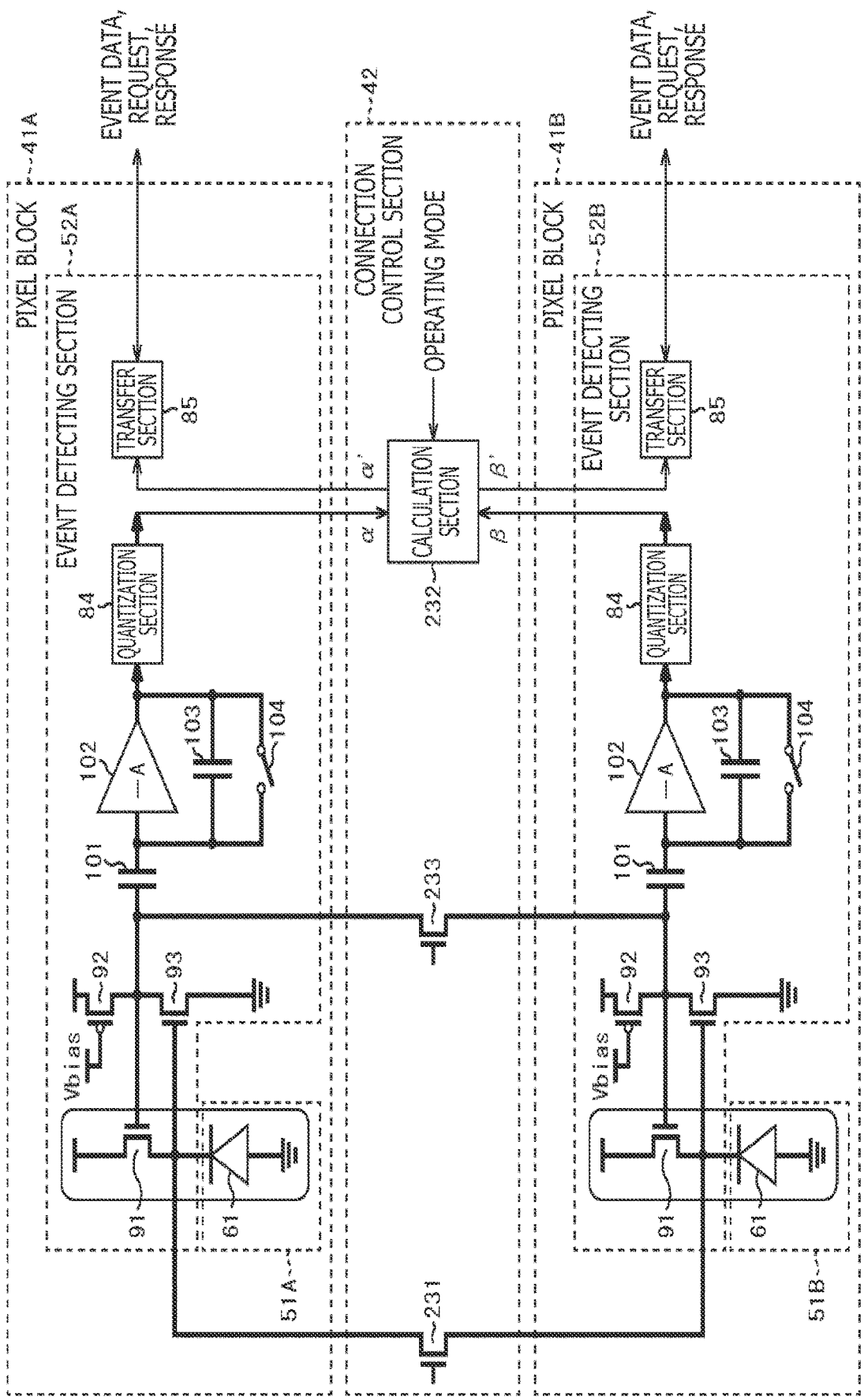

F I G. 2 5

| OPERATING MODE | FET231 | TRANSISTOR 92 OF EVENT DETECTING SECTION 52B | FET233 | CALCULATION |
|---|---|---|---|---|
| HIGH RESOLUTION (NORMAL) MODE | off | on | off | CALCULATION TABLE TL1 |
| LOW RESOLUTION MODE | on | off | off | CALCULATION TABLE TL2 |
| AVERAGE CURRENT AND VOLTAGE MODE | on | on | on | CALCULATION TABLE TL3 |

F I G . 2 7

| OPERATING MODE | | FET 231 | TRANSISTOR 92 OF EVENT DETECTING SECTION 52B | FET 234 | TRANSISTOR 92 OF EVENT DETECTING SECTION 52A | CALCULATION |
|---|---|---|---|---|---|---|
| HIGH RESOLUTION (NORMAL) MODE | | off | on | off | on | CALCULATION TABLE TL1 |
| LOW RESOLUTION MODE | MODE A | on | off | off | on | CALCULATION TABLE TL2 |
| | MODE B | on | on | off | off | CALCULATION TABLE TL2 |
| AVERAGE CURRENT MODE | | on | on | off | on | CALCULATION TABLE TL3 |
| HIGH RESOLUTION AND HIGH S/N MODE | | off | on | on | on | CALCULATION TABLE TL1 |

F I G . 3 3
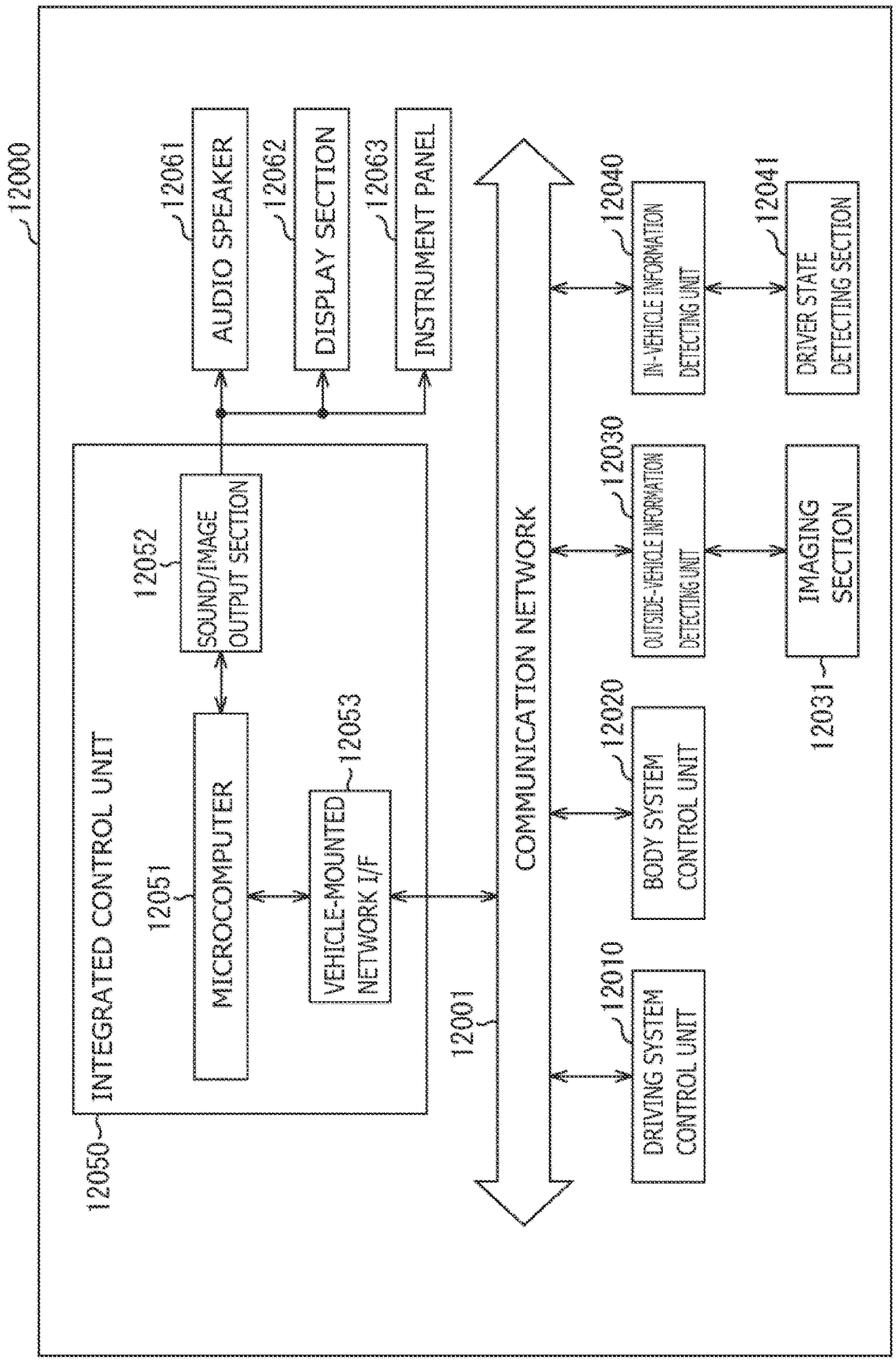

SENSOR AND CONTROL METHOD

TECHNICAL FIELD

The present technology relates to a sensor and a control method, in particular, to a sensor and a control method that achieve flexible acquisition of event data indicating the occurrence of events that are changes in electrical signal of pixels, for example.

BACKGROUND ART

There has been proposed an image sensor configured to output event data indicating the occurrence of events that are changes in luminance of pixels, in the case of occurrence of events (for example, see PTL 1).

Here, an image sensor configured to perform imaging in synchronization with a vertical synchronization signal and to output frame data that is image data in a frame format can be called a "synchronous image sensor." In contrast to this, an image sensor configured to output event data does not output the event data in synchronization with a vertical synchronization signal, and can thus be called an "asynchronous image sensor." Asynchronous image sensors are called "DVSs (Dynamic Vision Sensors)," for example.

CITATION LIST

Patent Literature

[PTL 1]
JP-T-2017-535999

SUMMARY

Technical Problem

DVSs have been demanded to flexibly acquire event data.
The present technology has been made in view of such a circumstance and achieves flexible acquisition of event data.

Solution to Problem

According to the present technology, there is provided a sensor including a pixel block including one or more pixels each configured to receive light and perform photoelectric conversion to generate an electrical signal and an event detecting section configured to detect an event that is a change in electrical signal of each of the pixels and a connection control section configured to switch connections between a plurality of the pixel blocks.

According to the present technology, there is provided a control method including a step of controlling a sensor, the sensor including a pixel block including one or more pixels each configured to receive light and perform photoelectric conversion to generate an electrical signal and an event detecting section configured to detect an event that is a change in electrical signal of each of the pixels, in which the sensor switches connections between a plurality of the pixel blocks.

In the sensor and the control method of the present technology, with regard to the pixel block including the one or more pixels each configured to perform photoelectric conversion to generate an electrical signal and the event detecting section configured to detect an event that is a change in electrical signal of each of the pixels, the connections between the plurality of pixel blocks are switched.

The sensor may be an individual device or an internal block of a single device. Further, the sensor can be formed as a module or a semiconductor chip.

BRIEF DESCRIPTION OF DRAWINGS

FIG. 7 is a circuit diagram illustrating configuration examples of a subtraction section 83 and a quantization section 84.

FIG. 19 is a diagram illustrating the operating modes of the connection control section 42.

FIG. 20 depicts diagrams illustrating calculation tables TL1, TL2, and TL3 that are used in calculation by a calculation section 232.

FIG. 23 is a diagram illustrating the flow of the photocurrents in a case where the connection control section 42 is in the operating mode of an average current mode.

FIG. 24 is a diagram illustrating a second configuration example of the connection control section 42.

FIG. 25 is a diagram illustrating the operating modes of the connection control section 42.

FIG. 27 is a diagram illustrating the operating modes of the connection control section 42.

FIG. 33 is a block diagram depicting an example of schematic configuration of a vehicle control system.

DESCRIPTION OF EMBODIMENT

<Sensor Chip to which Present Technology is Applicable>

Figure 1:
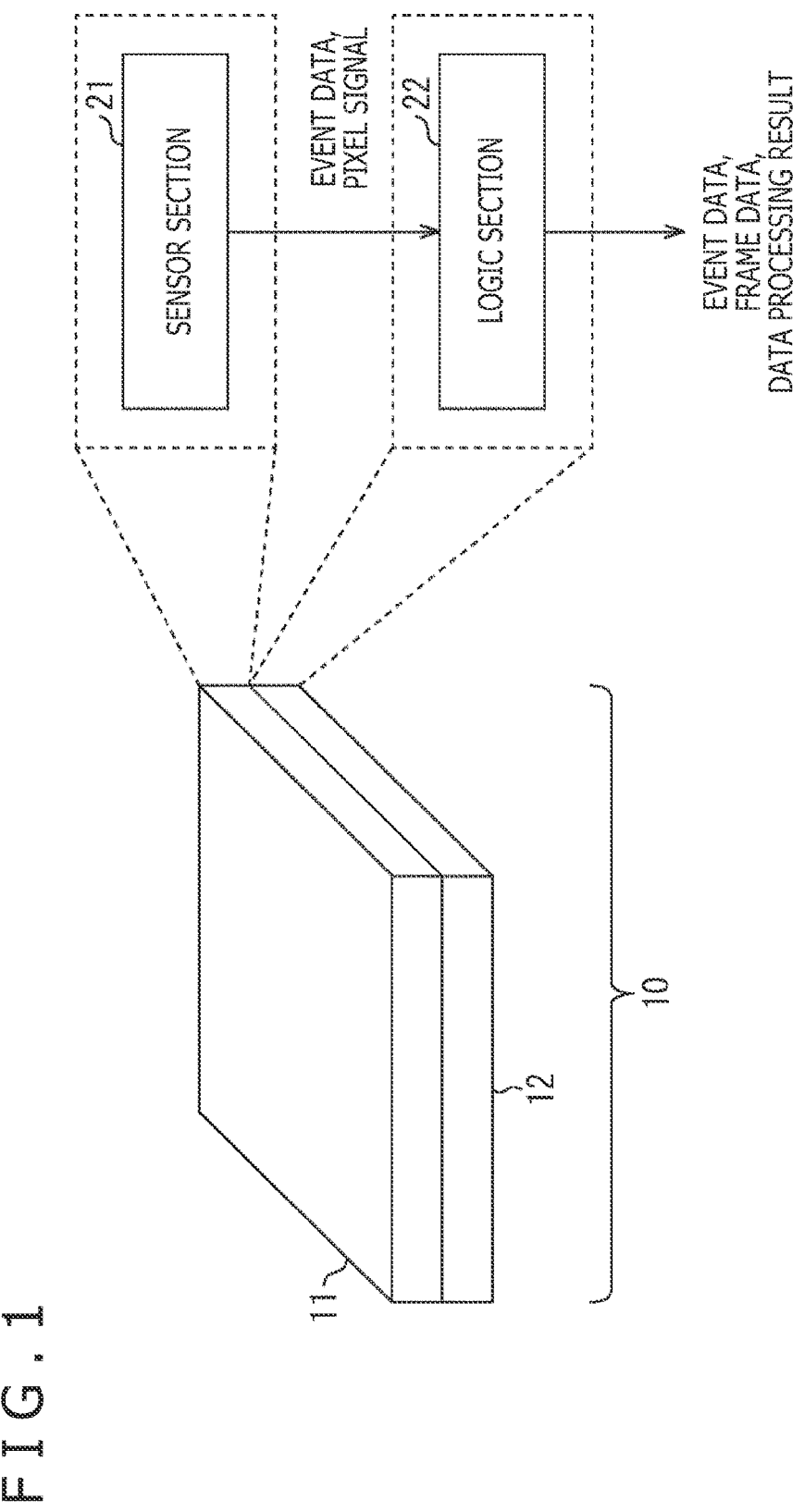
FIG. 1 is a diagram illustrating a configuration example of a sensor chip to which the present technology is applicable.

FIG. 1 is a diagram illustrating a configuration example of a sensor chip to which the present technology is applicable.

A sensor chip 10 is a single-chip semiconductor chip and includes a sensor die (substrate) 11, which serves as a plurality of dies (substrates), and a logic die 12 that are stacked. Note that, the sensor chip 10 can also include only a single die or three or more stacked dies.

In the sensor chip 10 of FIG. 1, the sensor die 11 includes (a circuit serving as) a sensor section 21, and the logic die 12 includes a logic section 22. Note that, the sensor section 21 can be partly formed on the logic die 12. Further, the logic section 22 can be partly formed on the sensor die 11.

The sensor section 21 includes pixels configured to perform photoelectric conversion on incident light to generate electrical signals, and generates event data indicating the occurrence of events that are changes in the electrical signal of the pixels. The sensor section 21 supplies the event data to the logic section 22. That is, the sensor section 21 performs imaging of performing, in the pixels, photoelectric conversion on incident light to generate electrical signals, similarly to a synchronous image sensor, for example. The sensor section 21, however, generates event data indicating the occurrence of events that are changes in the electrical signal of the pixels instead of generating image data in a frame format (frame data). The sensor section 21 outputs, to the logic section 22, the event data obtained by the imaging.

Here, the synchronous image sensor is an image sensor configured to perform imaging in synchronization with a vertical synchronization signal and output frame data that is image data in a frame format. The sensor section 21 can be regarded as asynchronous (an asynchronous image sensor) in contrast to the synchronous image sensor, since the sensor section 21 does not operate in synchronization with a vertical synchronization signal when outputting event data.

Note that, the sensor section 21 can generate and output, other than event data, frame data, similarly to the synchronous image sensor. In addition, the sensor section 21 can output, together with event data, electrical signals of pixels in which events have occurred, as pixel signals that are pixel values of the pixels in frame data.

The logic section 22 controls the sensor section 21 as needed. Further, the logic section 22 performs various types of data processing, such as data processing of generating frame data on the basis of event data from the sensor section 21 and image processing on frame data from the sensor section 21 or frame data generated on the basis of the event data from the sensor section 21, and outputs data processing results obtained by performing the various types of data processing on the event data and the frame data.

Configuration Example of Sensor Section 21

Figure 2:
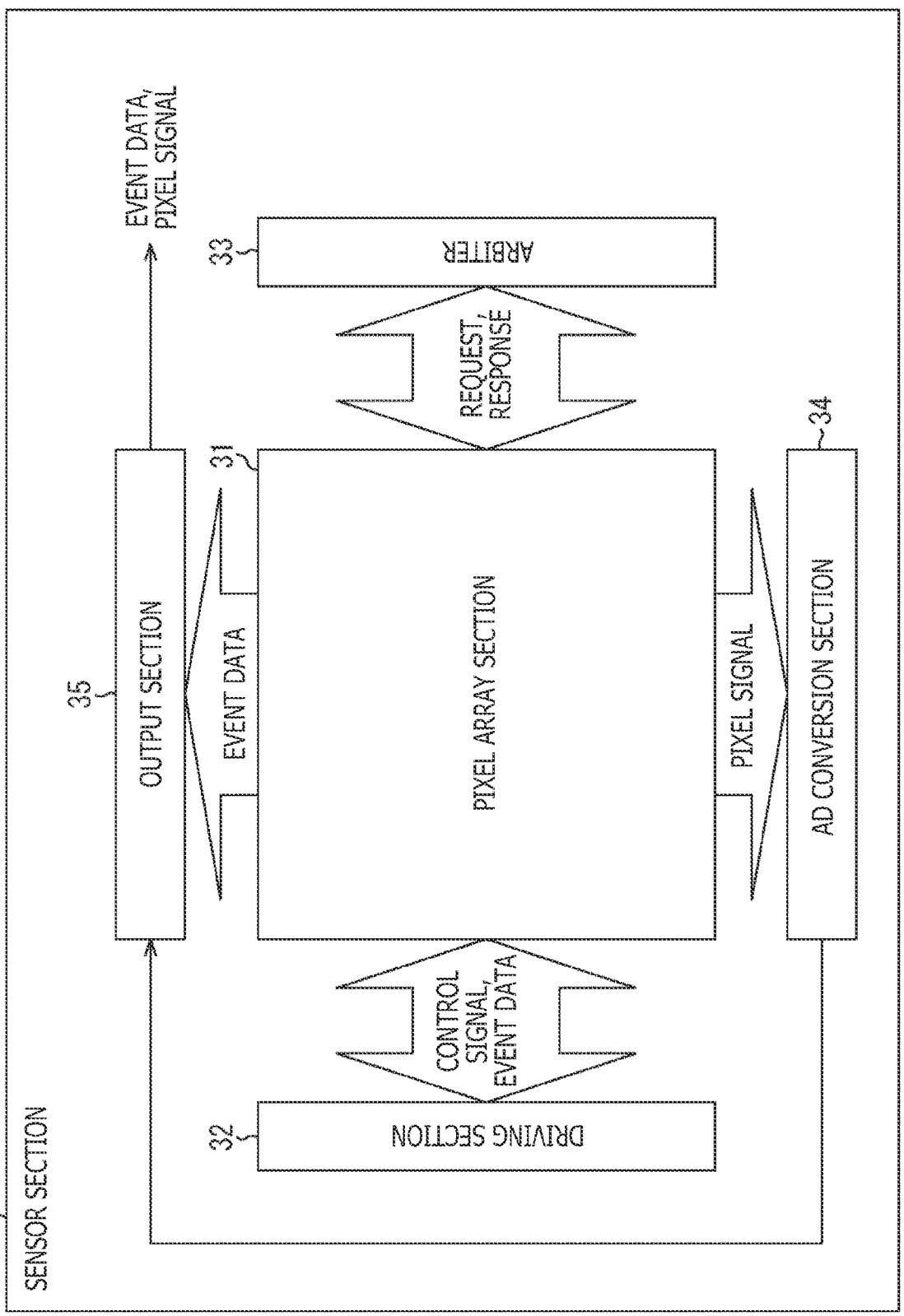
FIG. 2 is a block diagram illustrating a configuration example of a sensor section 21.

FIG. 2 is a block diagram illustrating a configuration example of the sensor section 21 of FIG. 1.

The sensor section 21 includes a pixel array section 31, a driving section 32, an arbiter 33, an AD (Analog to Digital) conversion section 34, and an output section 35.

The pixel array section 31 includes a plurality of pixels 51 (FIG. 3) arrayed in a two-dimensional lattice pattern. The pixel array section 31 detects, in a case where a change larger than a predetermined threshold (including a change equal to or larger than the threshold as needed) has occurred in (a voltage corresponding to) a photocurrent that is an electrical signal generated by photoelectric conversion in the pixel 51, the change in the photocurrent as an event. In a case of detecting an event, the pixel array section 31 outputs, to the arbiter 33, a request for requesting the output of event data indicating the occurrence of the event. Then, in a case of receiving a response indicating event data output permission from the arbiter 33, the pixel array section 31 outputs the event data to the driving section 32 and the output section 35. In addition, the pixel array section 31 outputs an electrical signal of the pixel 51 in which the event has been detected to the AD conversion section 34, as a pixel signal.

The driving section 32 supplies control signals to the pixel array section 31 to drive the pixel array section 31. For example, the driving section 32 drives the pixel 51 regarding which the pixel array section 31 has output event data, so that the pixel 51 in question supplies (outputs) a pixel signal to the AD conversion section 34.

The arbiter 33 arbitrates the requests for requesting the output of event data from the pixel array section 31, and returns responses indicating event data output permission or prohibition to the pixel array section 31.

The AD conversion section 34 includes, for example, a single-slope ADC (AD converter) (not illustrated) in each column of pixel blocks 41 (FIG. 3) described later, for example. The AD conversion section 34 performs, with the ADC in each column, AD conversion on pixel signals of the pixels 51 of the pixel blocks 41 in the column, and supplies the resultant to the output section 35. Note that, the AD conversion section 34 can perform CDS (Correlated Double Sampling) together with pixel signal AD conversion.

The output section 35 performs necessary processing on the pixel signals from the AD conversion section 34 and the event data from the pixel array section 31 and supplies the resultant to the logic section 22 (FIG. 1).

Here, a change in the photocurrent generated in the pixel 51 can be recognized as a change in the amount of light entering the pixel 51, so that it can also be said that an event is a change in light amount (a change in light amount larger than the threshold) in the pixel 51.

Event data indicating the occurrence of an event at least includes location information (coordinates or the like) indicating the location of a pixel block in which a change in light amount, which is the event, has occurred. Besides, the event data can also include the polarity (positive or negative) of the change in light amount.

With regard to the series of event data that is output from the pixel array section 31 at timings at which events have occurred, it can be said that, as long as the event data interval is the same as the event occurrence interval, the event data implicitly includes time point information indicating (relative) time points at which the events have occurred. However, for example, when the event data is stored in a memory and the event data interval is no longer the same as the event occurrence interval, the time point information implicitly included in the event data is lost. Thus, the output section 35 includes, in event data, time point information indicating (relative) time points at which events have occurred, such as timestamps, before the event data interval is changed from the event occurrence interval. The processing of including time point information in event data can be performed in any block other than the output section 35 as long as the processing is performed before time point information implicitly included in event data is lost.

Configuration Example of Pixel Array Section 31

Figure 3:
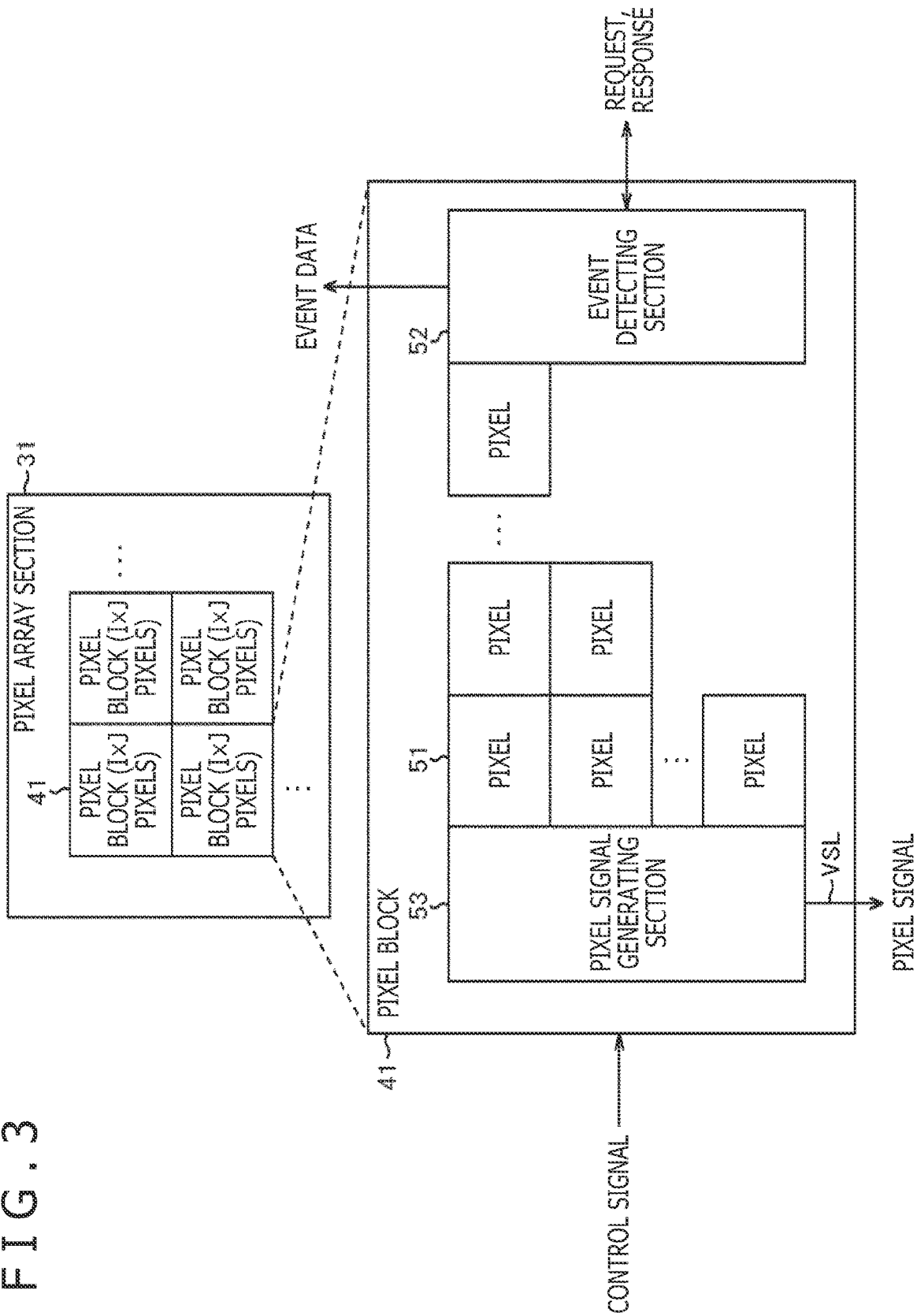
FIG. 3 is a block diagram illustrating a configuration example of a pixel array section 31.

FIG. 3 is a block diagram illustrating a configuration example of the pixel array section 31 of FIG. 2.

The pixel array section 31 includes the plurality of pixel blocks 41. The pixel block 41 includes the I×J pixels 51 that are one or more pixels arrayed in I rows and J columns (I and J are integers), an event detecting section 52, and a pixel signal generating section 53. The one or more pixels 51 in the pixel block 41 share the event detecting section 52 and the pixel signal generating section 53. Further, in each column of the pixel blocks 41, a VSL (Vertical Signal Line) for connecting the pixel blocks 41 to the ADC of the AD conversion section 34 is wired.

The pixel 51 receives light incident from an object and performs photoelectric conversion to generate a photocurrent serving as an electrical signal. The pixel 51 supplies the photocurrent to the event detecting section 52 under the control of the driving section 32.

The event detecting section 52 detects, as an event, a change larger than the predetermined threshold in photocurrent from each of the pixels 51, under the control of the driving section 32. In a case of detecting an event, the event detecting section 52 supplies, to the arbiter 33 (FIG. 2), a request for requesting the output of event data indicating the occurrence of the event. Then, when receiving a response indicating event data output permission to the request from the arbiter 33, the event detecting section 52 outputs the event data to the driving section 32 and the output section 35.

The pixel signal generating section 53 generates, in the case where the event detecting section 52 has detected an event, a voltage corresponding to a photocurrent from the pixel 51 as a pixel signal, and supplies the voltage to the AD conversion section 34 through the VSL, under the control of the driving section 32.

Here, detecting a change larger than the predetermined threshold in photocurrent as an event can also be recognized as detecting, as an event, absence of change larger than the predetermined threshold in photocurrent. The pixel signal generating section 53 can generate a pixel signal in the case where absence of change larger than the predetermined threshold in photocurrent has been detected as an event as well as in the case where a change larger than the predetermined threshold in photocurrent has been detected as an event.

Configuration Example of Pixel Block 41

Figure 4:
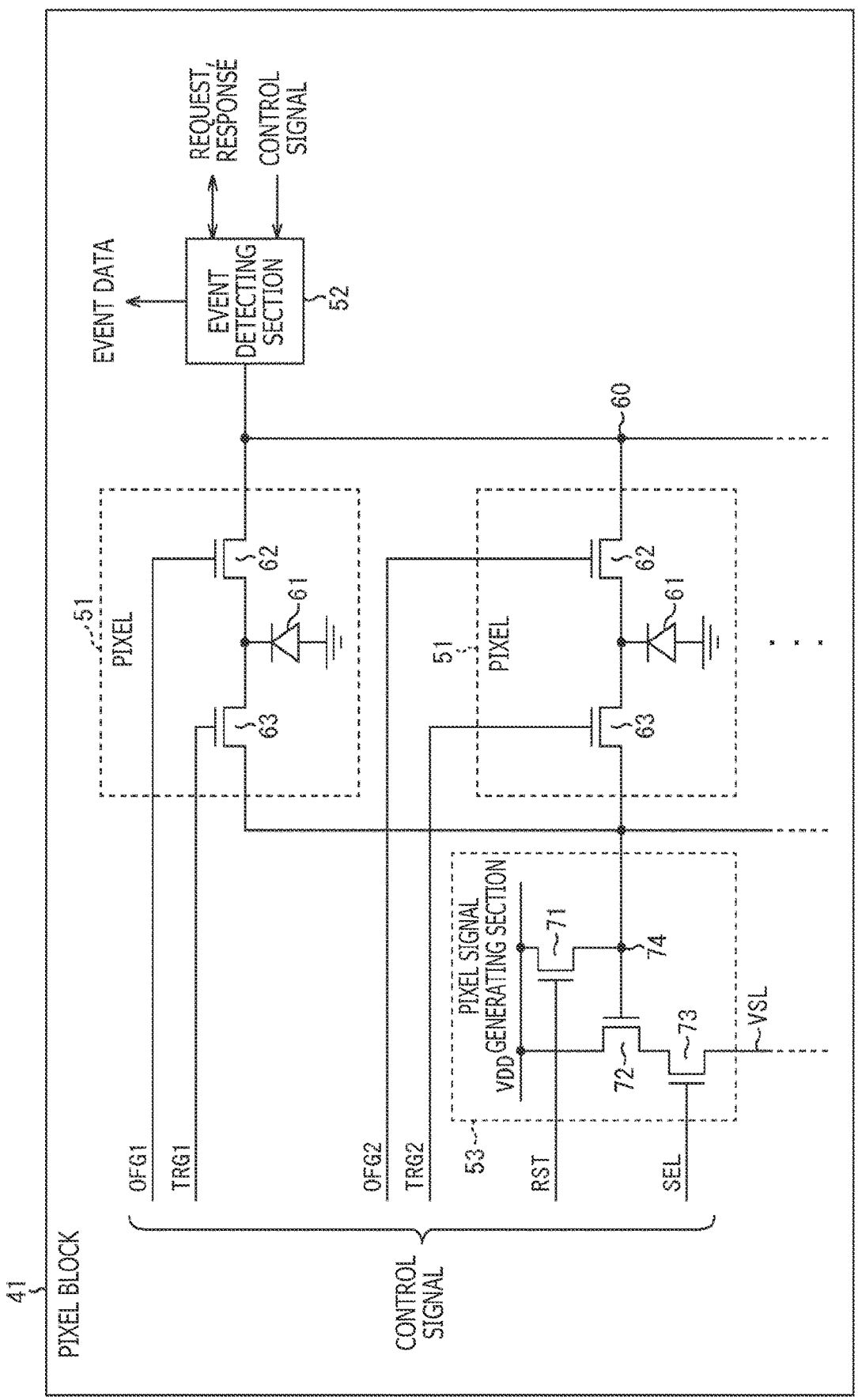
FIG. 4 is a circuit diagram illustrating a configuration example of a pixel block 41.

FIG. 4 is a circuit diagram illustrating a configuration example of the pixel block 41.

The pixel block 41 includes, as described with reference to FIG. 3, the pixels 51, the event detecting section 52, and the pixel signal generating section 53.

The pixel 51 includes a photoelectric conversion element 61 and transfer transistors 62 and 63.

The photoelectric conversion element 61 includes, for example, a PD (Photodiode). The photoelectric conversion element 61 receives incident light and performs photoelectric conversion to generate charges.

The transfer transistor 62 includes, for example, an N (Negative)-type MOS (Metal-Oxide-Semiconductor) FET (Field Effect Transistor). The transfer transistor 62 of the n-th pixel 51 of the I×J pixels 51 in the pixel block 41 is turned on or off in response to a control signal ORGn supplied from the driving section 32 (FIG. 2). When the transfer transistor 62 is turned on, charges generated in the photoelectric conversion element 61 are transferred (supplied) to the event detecting section 52, as a photocurrent.

The transfer transistor 63 includes, for example, an N-type MOSFET. The transfer transistor 63 of the n-th pixel 51 of the I×J pixels 51 in the pixel block 41 is turned on or off in response to a control signal TRGn supplied from the driving section 32. When the transfer transistor 63 is turned on, charges generated in the photoelectric conversion element 61 are transferred to an FD 74 of the pixel signal generating section 53.

The I×J pixels 51 in the pixel block 41 are connected to the event detecting section 52 of the pixel block 41 through nodes 60. Thus, photocurrents generated in (the photoelectric conversion elements 61 of) the pixels 51 are supplied to the event detecting section 52 through the nodes 60. As a result, the event detecting section 52 receives the sum of photocurrents from all the pixels 51 in the pixel block 41. Thus, the event detecting section 52 detects, as an event, a change in sum of photocurrents supplied from the I×J pixels 51 in the pixel block 41.

The pixel signal generating section 53 includes a reset transistor 71, an amplification transistor 72, a selection transistor 73, and the FD (Floating Diffusion) 74.

The reset transistor 71, the amplification transistor 72, and the selection transistor 73 include, for example, N-type MOSFETs.

The reset transistor 71 is turned on or off in response to a control signal RST supplied from the driving section 32 (FIG. 2). When the reset transistor 71 is turned on, the FD 74 is connected to a power supply VDD, and charges accumulated in the FD 74 are thus discharged to the power supply VDD. With this, the FD 74 is reset.

The amplification transistor 72 has a gate connected to the FD 74, a drain connected to the power supply VDD, and a source connected to the VSL through the selection transistor 73. The amplification transistor 72 is a source follower and outputs a voltage (electrical signal) corresponding to the voltage of the FD 74 supplied to the gate to the VSL through the selection transistor 73.

The selection transistor 73 is turned on or off in response to a control signal SEL supplied from the driving section 32. When the reset transistor 71 is turned on, a voltage corresponding to the voltage of the FD 74 from the amplification transistor 72 is output to the VSL.

The FD 74 accumulates charges transferred from the photoelectric conversion elements 61 of the pixels 51 through the transfer transistors 63, and converts the charges to voltages.

With regard to the pixels 51 and the pixel signal generating section 53, which are configured as described above, the driving section 32 turns on the transfer transistors 62 with control signals OFGn, so that the transfer transistors 62 supply, to the event detecting section 52, photocurrents based on charges generated in the photoelectric conversion elements 61 of the pixels 51. With this, the event detecting section 52 receives a current that is the sum of the photocurrents from all the pixels 51 in the pixel block 41.

When the event detecting section 52 detects, as an event, a change in photocurrent (sum of photocurrents) in the pixel block 41, the driving section 32 turns off the transfer transistors 62 of all the pixels 51 in the pixel block 41, to thereby stop the supply of the photocurrents to the event detecting section 52. Then, the driving section 32 sequentially turns on, with the control signals TRGn, the transfer transistors 63 of the pixels 51 in the pixel block 41 in which the event has been detected, so that the transfer transistors 63 transfer charges generated in the photoelectric conversion elements 61 to the FD 74. The FD 74 accumulates the charges transferred from (the photoelectric conversion elements 61 of) the pixels 51. Voltages corresponding to the charges accumulated in the FD 74 are output to the VSL, as pixel signals of the pixels 51, through the amplification transistor 72 and the selection transistor 73.

As described above, in the sensor section 21 (FIG. 2), only pixel signals of the pixels 51 in the pixel block 41 in which an event has been detected are sequentially output to the VSL. The pixel signals output to the VSL are supplied to the AD conversion section 34 to be subjected to AD conversion.

Here, in the pixels 51 in the pixel block 41, the transfer transistors 63 can be turned on not sequentially but simultaneously. In this case, the sum of pixel signals of all the pixels 51 in the pixel block 41 can be output.

In the pixel array section 31 of FIG. 3, the pixel block 41 includes one or more pixels 51, and the one or more pixels 51 share the event detecting section 52 and the pixel signal generating section 53. Thus, in the case where the pixel block 41 includes a plurality of pixels 51, the numbers of the event detecting sections 52 and the pixel signal generating sections 53 can be reduced as compared to a case where the event detecting section 52 and the pixel signal generating section 53 are provided for each of the pixels 51, with the result that the scale of the pixel array section 31 can be reduced.

Note that, in the case where the pixel block 41 includes a plurality of pixels 51, the event detecting section 52 can be provided for each of the pixels 51. In the case where the plurality of pixels 51 in the pixel block 41 share the event detecting section 52, events are detected in units of the pixel blocks 41. In the case where the event detecting section 52 is provided for each of the pixels 51, however, events can be detected in units of the pixels 51.

Yet, even in the case where the plurality of pixels 51 in the pixel block 41 share the single event detecting section 52, events can be detected in units of the pixels 51 when the transfer transistors 62 of the plurality of pixels 51 are temporarily turned on in a time-division manner.

Further, in a case where there is no need to output pixel signals, the pixel block 41 can be formed without the pixel signal generating section 53. In the case where the pixel block 41 is formed without the pixel signal generating section 53, the sensor section 21 can be formed without the AD conversion section 34 and the transfer transistors 63. In this case, the scale of the sensor section 21 can be reduced.

Configuration Example of Event Detecting Section 52

Figure 5:
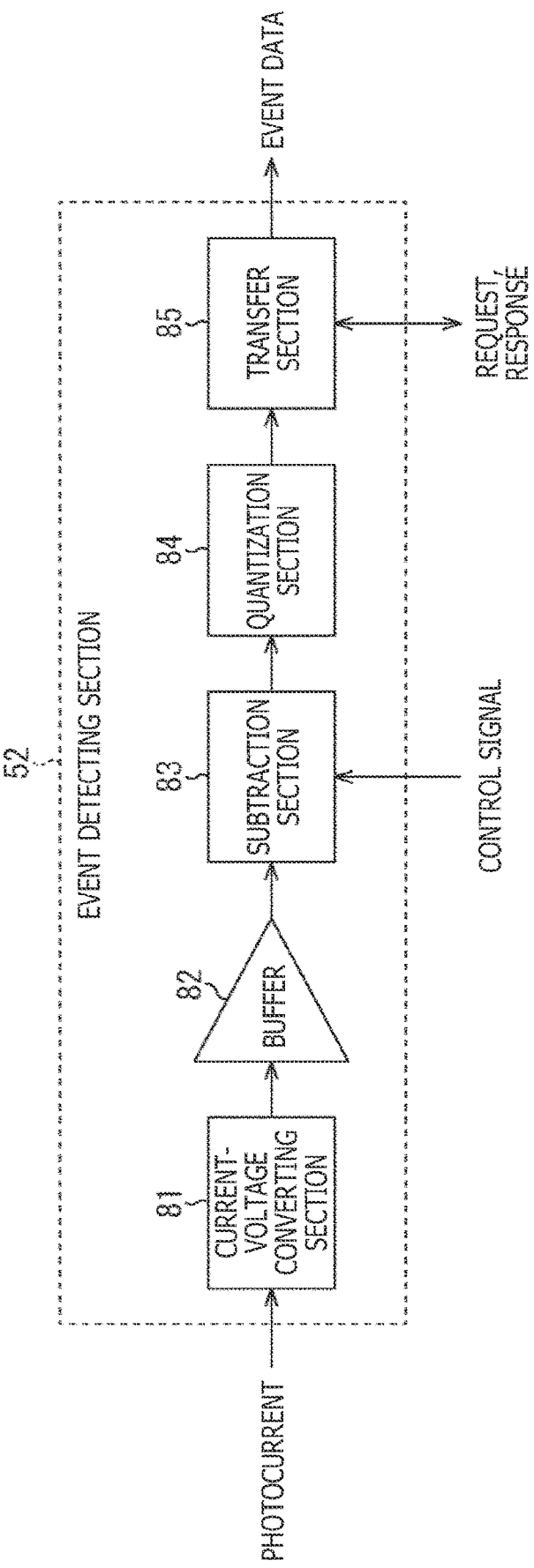
FIG. 5 is a block diagram illustrating a configuration example of an event detecting section 52.

FIG. 5 is a block diagram illustrating a configuration example of the event detecting section 52 of FIG. 3.

The event detecting section 52 includes a current-voltage converting section 81, a buffer 82, a subtraction section 83, a quantization section 84, and a transfer section 85.

The current-voltage converting section 81 converts (sum of) photocurrents from the pixels 51 to voltages corresponding to the logarithms of the photocurrents (hereinafter also referred to as a "photovoltage") and supplies the voltages to the buffer 82.

The buffer 82 buffers photovoltages from the current-voltage converting section 81 and supplies the resultant to the subtraction section 83.

The subtraction section 83 calculates, at a timing instructed by a row driving signal that is a control signal from the driving section 32, a difference between the current photovoltage and a photovoltage at a timing slightly shifted from the current time, and supplies a difference signal corresponding to the difference to the quantization section 84.

The quantization section 84 quantizes difference signals from the subtraction section 83 to digital signals and supplies the quantized values of the difference signals to the transfer section 85 as event data.

The transfer section 85 transfers (outputs), on the basis of event data from the quantization section 84, the event data to the output section 35. That is, the transfer section 85 supplies a request for requesting the output of the event data to the arbiter 33. Then, when receiving a response indicating event data output permission to the request from the arbiter 33, the transfer section 85 outputs the event data to the output section 35.

Configuration Example of Current-Voltage Converting Section 81

Figure 6:
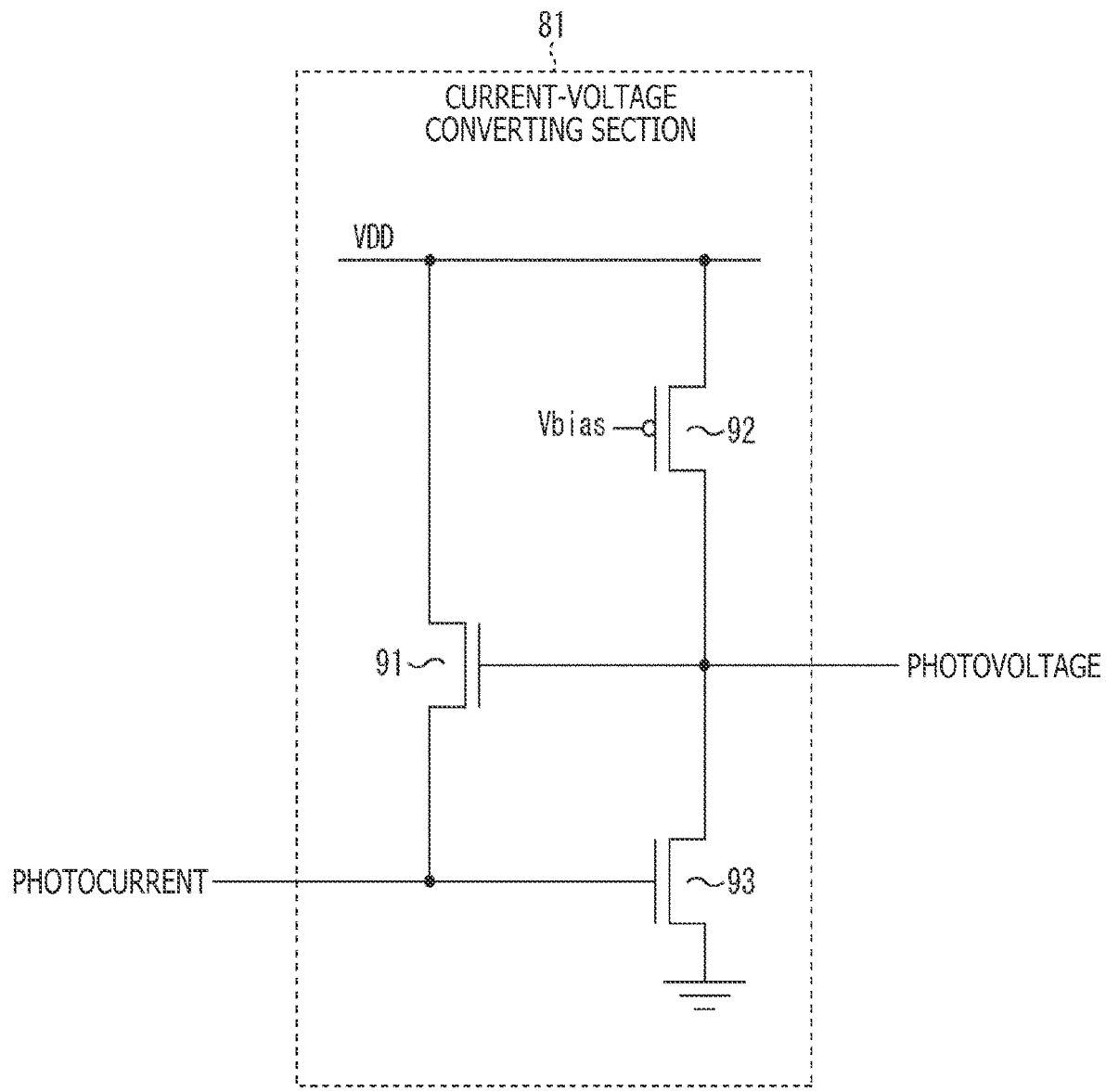
FIG. 6 is a circuit diagram illustrating a configuration example of a current-voltage converting section 81.

FIG. 6 is a circuit diagram illustrating a configuration example of the current-voltage converting section 81 of FIG. 5.

The current-voltage converting section 81 includes transistors 91 to 93. As the transistors 91 and 93, for example, N-type MOSFETs can be employed. As the transistor 92, for example, a P-type MOSFET can be employed.

The transistor 91 has a source connected to the gate of the transistor 93, and a photocurrent is supplied from the pixel 51 to the connecting point between the source of the transistor 91 and the gate of the transistor 93. The transistor 91 has a drain connected to the power supply VDD and a gate connected to the drain of the transistor 93.

The transistor 92 has a source connected to the power supply VDD and a drain connected to the connecting point between the gate of the transistor 91 and the drain of the transistor 93. A predetermined bias voltage Vbias is applied to the gate of the transistor 92. With the bias voltage Vbias, the transistor 92 is turned on or off, and the operation of the current-voltage converting section 81 is turned on or off depending on whether the transistor 92 is turned on or off.

The source of the transistor 93 is grounded.

In the current-voltage converting section 81, the transistor 91 has the drain connected on the power supply VDD side and is thus a source follower. The source of the transistor 91, which is the source follower, is connected to the pixels 51 (FIG. 4), so that photocurrents based on charges generated in the photoelectric conversion elements 61 of the pixels 51 flow through the transistor 91 (from the drain to the source). The transistor 91 operates in a subthreshold region, and at the gate of the transistor 91, photovoltages corresponding to the logarithms of the photocurrents flowing through the transistor 91 are generated. As described above, in the current-voltage converting section 81, the transistor 91 converts photocurrents from the pixels 51 to photovoltages corresponding to the logarithms of the photocurrents.

In the current-voltage converting section 81, the transistor 91 has the gate connected to the connecting point between the drain of the transistor 92 and the drain of the transistor 93, and the photovoltages are output from the connecting point in question.

Configuration Examples of Subtraction Section 83 and Quantization Section 84

FIG. 7 is a circuit diagram illustrating configuration examples of the subtraction section 83 and the quantization section 84 of FIG. 5.

The subtraction section 83 includes a capacitor 101, an operational amplifier 102, a capacitor 103, and a switch 104. The quantization section 84 includes a comparator 111.

The capacitor 101 has one end connected to the output terminal of the buffer 82 (FIG. 5) and the other end connected to the input terminal (inverting input terminal) of the operational amplifier 102. Thus, photovoltages are input to the input terminal of the operational amplifier 102 through the capacitor 101.

The operational amplifier 102 has an output terminal connected to the non-inverting input terminal (+) of the comparator 111.

The capacitor 103 has one end connected to the input terminal of the operational amplifier 102 and the other end connected to the output terminal of the operational amplifier 102.

The switch 104 is connected to the capacitor 103 to switch the connections between the ends of the capacitor 103. The switch 104 is turned on or off in response to a row driving signal that is a control signal from the driving section 32, to thereby switch the connections between the ends of the capacitor 103.

A photovoltage on the buffer 82 (FIG. 5) side of the capacitor 101 when the switch 104 is on is denoted by Vinit, and the capacitance (electrostatic capacitance) of the capacitor 101 is denoted by C1. The input terminal of the operational amplifier 102 serves as a virtual ground terminal, and a charge Qinit that is accumulated in the capacitor 101 in the case where the switch 104 is on is expressed by Expression (1).

$$Q\text{init} = C1 \times V\text{init} \qquad (1)$$

Further, in the case where the switch 104 is on, the connection between the ends of the capacitor 103 is cut (short-circuited), so that no charge is accumulated in the capacitor 103.

When a photovoltage on the buffer 82 (FIG. 5) side of the capacitor 101 in the case where the switch 104 has thereafter been turned off is denoted by Vafter, a charge Qafter that is accumulated in the capacitor 101 in the case where the switch 104 is off is expressed by Expression (2).

$$Q\text{after} = C1 \times V\text{after} \qquad (2)$$

When the capacitance of the capacitor 103 is denoted by C2 and the output voltage of the operational amplifier 102 is denoted by Vout, a charge Q2 that is accumulated in the capacitor 103 is expressed by Expression (3).

$$Q2 = -C2 \times V\text{out} \qquad (3)$$

Since the total amount of charges in the capacitors 101 and 103 does not change before and after the switch 104 is turned off, Expression (4) is established.

$$Q\text{init} = Q\text{after} + Q2 \qquad (4)$$

When Expression (1) to Expression (3) are substituted for Expression (4), Expression (5) is obtained.

$$V\text{out} = -(C1/C2) \times (V\text{after} - V\text{init}) \qquad (5)$$

With Expression (5), the subtraction section 83 subtracts the photovoltage Vinit from the photovoltage Vafter, that is, calculates the difference signal (Vout) corresponding to a difference Vafter−Vinit between the photovoltages Vafter and Vinit. With Expression (5), the subtraction gain of the subtraction section 83 is C1/C2. Since the maximum gain is normally desired, C1 is preferably set to a large value and C2 is preferably set to a small value. Meanwhile, when C2 is too small, kTC noise increases, resulting in a risk of deteriorated noise characteristics. Thus, the capacitance C2 can only be reduced in a range that achieves acceptable noise. Further, since the pixel blocks 41 each have installed therein the event detecting section 52 including the subtraction section 83, the capacitances C1 and C2 have space constraints. In consideration of these matters, the values of the capacitances C1 and C2 are determined.

The comparator 111 compares a difference signal from the subtraction section 83 with a predetermined threshold (voltage) Vth (>0) applied to the inverting input terminal (−), thereby quantizing the difference signal. The comparator 111 outputs the quantized value obtained by the quantization to the transfer section 85 as event data.

For example, in a case where a difference signal is larger than the threshold Vth, the comparator 111 outputs an H (High) level indicating 1, as event data indicating the occurrence of an event. In a case where a difference signal is not larger than the threshold Vth, the comparator 111 outputs an L (Low) level indicating 0, as event data indicating that no event has occurred.

The transfer section 85 supplies a request to the arbiter 33 in a case where it is confirmed on the basis of event data from the quantization section 84 that a change in light amount that is an event has occurred, that is, in the case where the difference signal (Vout) is larger than the threshold Vth. When receiving a response indicating event data output permission, the transfer section 85 outputs the event data indicating the occurrence of the event (for example, H level) to the output section 35.

The output section 35 includes, in event data from the transfer section 85, location information regarding (the pixel block 41 including) the pixel 51 in which an event indicated by the event data has occurred and time point information indicating a time point at which the event has occurred, and further, as needed, the polarity of a change in light amount that is the event. The output section 35 outputs the event data.

As the data format of event data including location information regarding the pixel 51 in which an event has occurred, time point information indicating a time point at which the event has occurred, and the polarity of a change in light amount that is the event, for example, the data format called "AER (Address Event Representation)" can be employed.

Note that, a gain A of the entire event detecting section 52 is expressed by the following expression where the gain of the current-voltage converting section 81 is denoted by $CG_{log}$ and the gain of the buffer 82 is 1.

$$A = CG_{log} \, C1/C2 (\Sigma i_{photo\_n}) \qquad (6)$$

Here, $i_{photo\_n}$ denotes a photocurrent of the n-th pixel 51 of the I×J pixels 51 in the pixel block 41. In Expression (6), Σ denotes the summation of n that takes integers ranging from 1 to I×J.

Note that, the pixel 51 can receive any light as incident light with an optical filter through which predetermined light passes, such as a color filter. For example, in a case where the pixel 51 receives visible light as incident light, event data indicates the occurrence of changes in pixel value in images including visible objects. Further, for example, in a case where the pixel 51 receives, as incident light, infrared light, millimeter waves, or the like for ranging, event data indicates the occurrence of changes in distances to objects. In addition, for example, in a case where the pixel 51 receives infrared light for temperature measurement, as incident light, event data indicates the occurrence of changes in temperature of objects. In the present embodiment, the pixel 51 is assumed to receive visible light as incident light.

Figure 8:
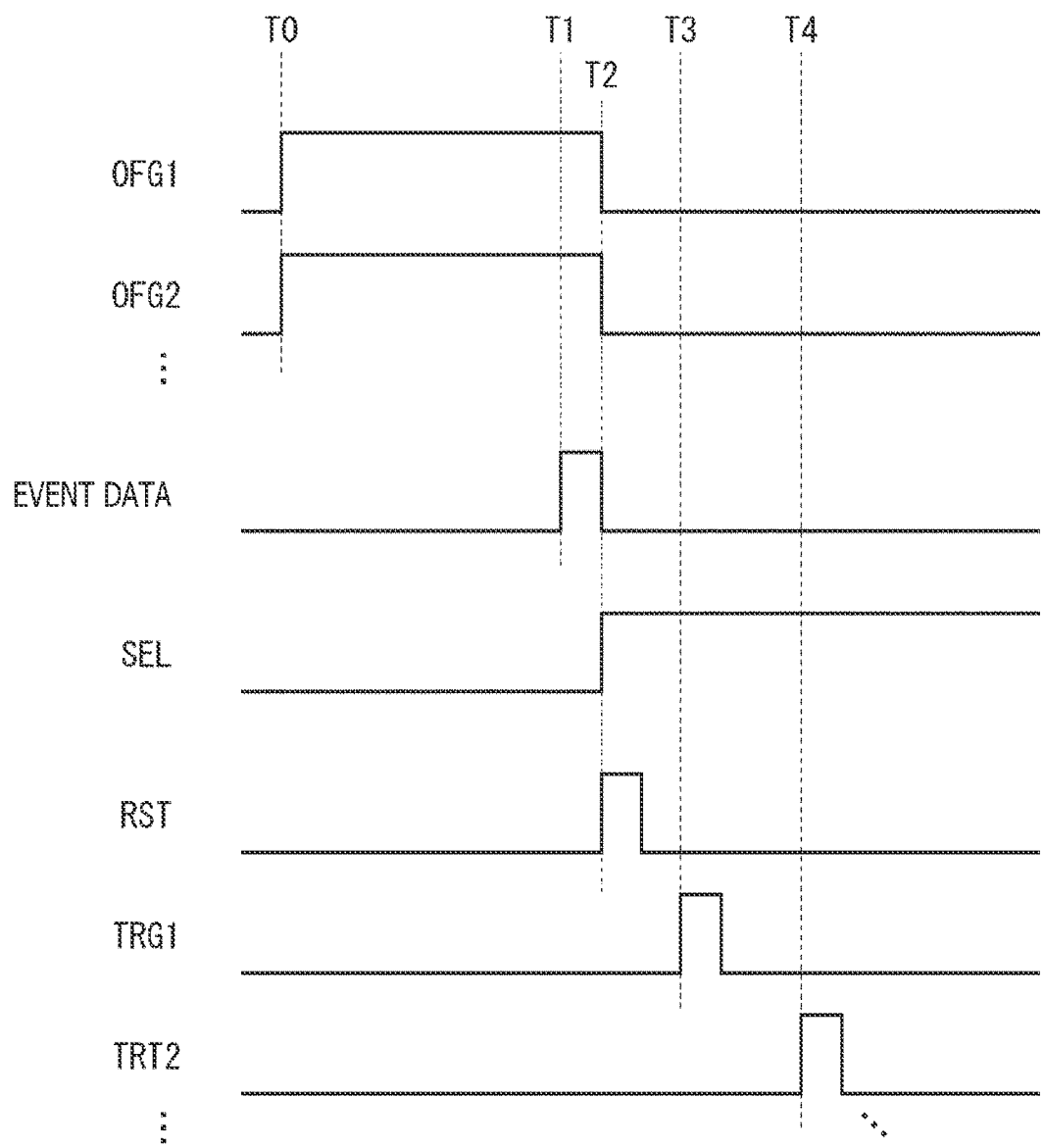
FIG. 8 is a timing chart illustrating an example of the operation of the sensor section 21.

FIG. 8 is a timing chart illustrating an example of the operation of the sensor section 21 of FIG. 2.

At Timing T0, the driving section 32 changes all the control signals OFGn from the L level to the H level, thereby turning on the transfer transistors 62 of all the pixels 51 in the pixel block 41. With this, the sum of photocurrents from all the pixels 51 in the pixel block 41 is supplied to the event detecting section 52. Here, the control signals TRGn are all at the L level, and hence the transfer transistors 63 of all the pixels 51 are off.

For example, at Timing T1, when detecting an event, the event detecting section 52 outputs event data at the H level in response to the detection of the event.

At Timing T2, the driving section 32 sets all the control signals OFGn to the L level on the basis of the event data at the H level, to stop the supply of the photocurrents from the pixels 51 to the event detecting section 52. Further, the driving section 32 sets the control signal SEL to the H level, and sets the control signal RST to the H level over a certain period of time, to control the FD 74 to discharge the charges to the power supply VDD, thereby resetting the FD 74. The pixel signal generating section 53 outputs, as a reset level, a pixel signal corresponding to the voltage of the FD 74 when the FD 74 has been reset, and the AD conversion section 34 performs AD conversion on the reset level.

At Timing T3 after the reset level AD conversion, the driving section 32 sets a control signal TRG1 to the H level over a certain period to control the first pixel 51 in the pixel block 41 in which the event has been detected to transfer, to the FD 74, charges generated by photoelectric conversion in (the photoelectric conversion element 61 of) the first pixel 51. The pixel signal generating section 53 outputs, as a signal level, a pixel signal corresponding to the voltage of the FD 74 to which the charges have been transferred from the pixel 51, and the AD conversion section 34 performs AD conversion on the signal level.

The AD conversion section 34 outputs, to the output section 35, a difference between the signal level and the reset level obtained after the AD conversion, as a pixel signal serving as a pixel value of the image (frame data).

Here, the processing of obtaining a difference between a signal level and a reset level as a pixel signal serving as a pixel value of an image is called "CDS." CDS can be performed after the AD conversion of a signal level and a reset level, or can be simultaneously performed with the AD conversion of a signal level and a reset level in a case where the AD conversion section 34 performs single-slope AD conversion. In the latter case, AD conversion is performed on the signal level by using the AD conversion result of the reset level as an initial value.

At Timing T4 after the AD conversion of the pixel signal of the first pixel 51 in the pixel block 41, the driving section 32 sets a control signal TRG2 to the H level over a certain period of time to control the second pixel 51 in the pixel block 41 in which the event has been detected to output a pixel signal.

In the sensor section 21, similar processing is executed thereafter, so that pixel signals of the pixels 51 in the pixel block 41 in which the event has been detected are sequentially output.

When the pixel signals of all the pixels 51 in the pixel block 41 are output, the driving section 32 sets all the control signals OFGn to the H level to turn on the transfer transistors 62 of all the pixels 51 in the pixel block 41.

<Frame Data Generation Based on Event Data>

Figure 9:
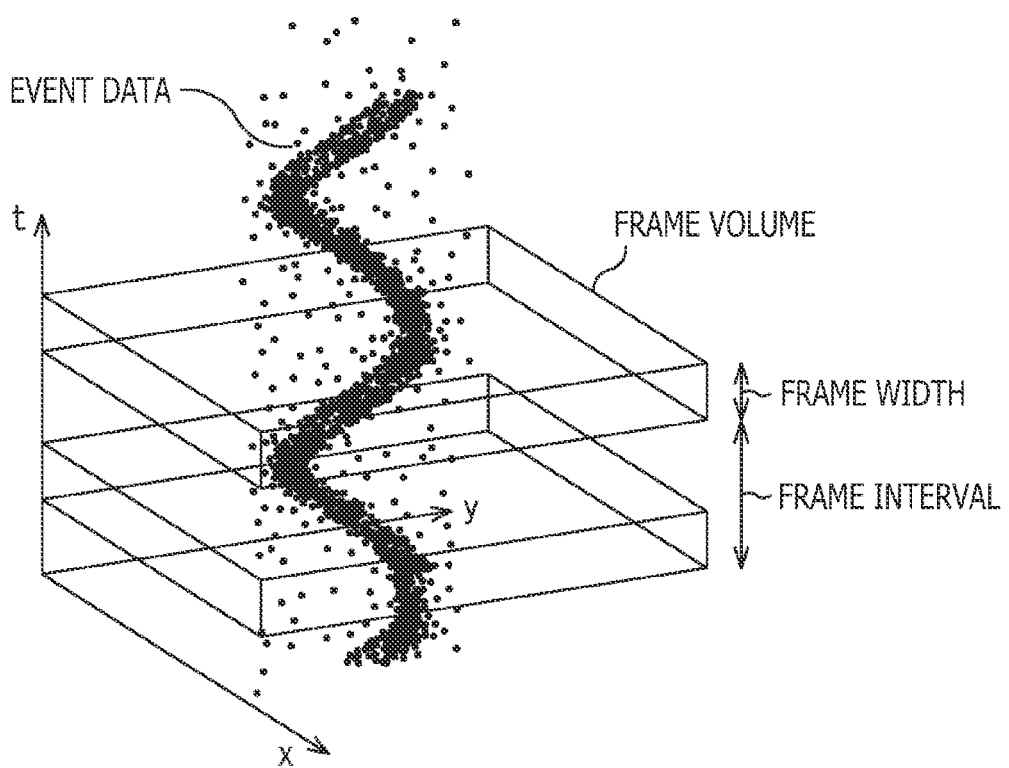
FIG. 9 is a diagram illustrating an example of a frame data generation method based on event data.

FIG. 9 is a diagram illustrating an example of a frame data generation method based on event data.

The logic section 22 sets a frame interval and a frame width on the basis of an externally input command, for example. Here, the frame interval represents the interval of frames of frame data that is generated on the basis of event data. The frame width represents the time width of event data that is used for generating frame data on a single frame. A frame interval and a frame width that are set by the logic section 22 are also referred to as a "set frame interval" and a "set frame width," respectively.

The logic section 22 generates, on the basis of the set frame interval, the set frame width, and event data from the sensor section 21, frame data that is image data in a frame format, to thereby convert the event data to the frame data.

That is, the logic section 22 generates, in each set frame interval, frame data on the basis of event data in the set frame width from the beginning of the set frame interval.

Here, it is assumed that event data includes time point information $t_i$ indicating a time point at which an event has occurred (hereinafter also referred to as an "event time point") and coordinates (x, y) serving as location information regarding (the pixel block 41 including) the pixel 51 in which the event has occurred (hereinafter also referred to as an "event location").

In FIG. 9, in a three-dimensional space (time and space) with the x axis, the y axis, and the time axis t, points representing event data are plotted on the basis of the event time point t and the event location (coordinates) (x, y) included in the event data.

That is, when a location (x, y, t) on the three-dimensional space indicated by the event time point t and the event location (x, y) included in event data is regarded as the space-time location of an event, in FIG. 9, the points representing the event data are plotted on the space-time locations (x, y, t) of the events.

The logic section 22 starts to generate frame data on the basis of event data by using, as a generation start time point at which frame data generation starts, a predetermined time point, for example, a time point at which frame data generation is externally instructed or a time point at which the sensor chip 10 is powered on.

Here, cuboids each having the set frame width in the direction of the time axis t in the set frame intervals, which appear from the generation start time point, are referred to as a "frame volume." The size of the frame volume in the x-axis direction or the y-axis direction is equal to the number of the pixel blocks 41 or the pixels 51 in the x-axis direction or the y-axis direction, for example.

The logic section 22 generates, in each set frame interval, frame data on a single frame on the basis of event data in the frame volume having the set frame width from the beginning of the set frame interval.

Frame data can be generated by, for example, setting white to a pixel (pixel value) in a frame at the event location (x, y) included in event data and setting a predetermined color such as gray to pixels at other locations in the frame.

Besides, in a case where event data includes the polarity of a change in light amount that is an event, frame data can be generated in consideration of the polarity included in the event data. For example, white can be set to pixels in the case a positive polarity, while black can be set to pixels in the case of a negative polarity.

In addition, in the case where pixel signals of the pixels 51 are also output when event data is output as described with reference to FIG. 3 and FIG. 4, frame data can be generated on the basis of the event data by using the pixel signals of the pixels 51. That is, frame data can be generated by setting, in a frame, a pixel at the event location (x, y) (in a block corresponding to the pixel block 41) included in event data to a pixel signal of the pixel 51 at the location (x, y) and setting a predetermined color such as gray to pixels at other locations.

Note that, in the frame volume, there are a plurality of pieces of event data that are different in the event time point t but the same in the event location (x, y) in some cases. In this case, for example, event data at the latest or oldest event time point t can be prioritized. Further, in the case where event data includes polarities, the polarities of a plurality of pieces of event data that are different in the event time point t but the same in the event location (x, y) can be added together, and a pixel value based on the added value obtained by the addition can be set to a pixel at the event location (x, y).

Here, in a case where the frame width and the frame interval are the same, the frame volumes are adjacent to each other without any gap. Further, in a case where the frame interval is larger than the frame width, the frame volumes are arranged with gaps. In a case where the frame width is larger than the frame interval, the frame volumes are arranged to be partly overlapped with each other.

Another Configuration Example of Quantization Section 84

Figure 10:
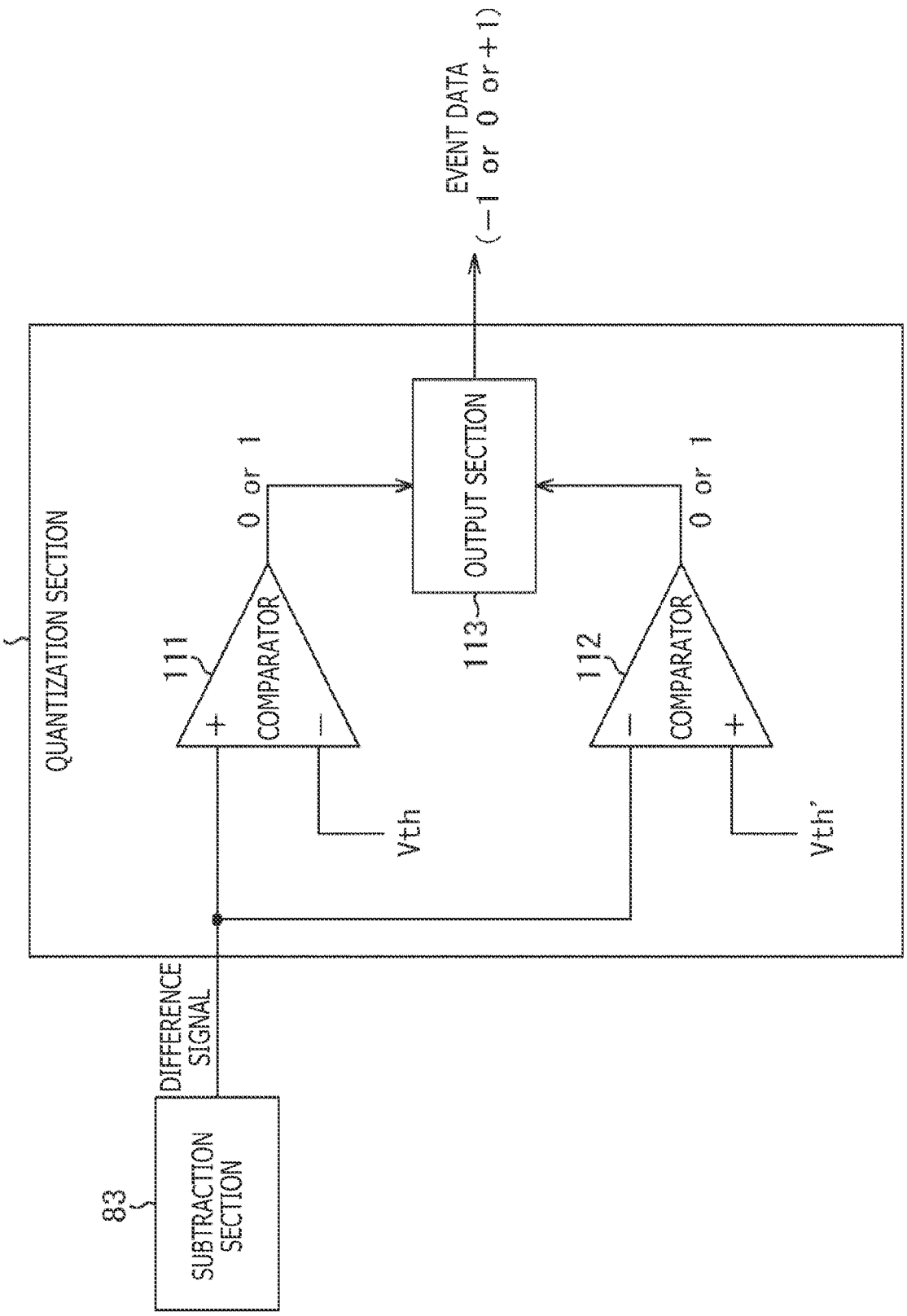
FIG. 10 is a block diagram illustrating another configuration example of the quantization section 84.

FIG. 10 is a block diagram illustrating another configuration example of the quantization section 84 of FIG. 5.

Note that, in FIG. 10, parts corresponding to those in the case of FIG. 7 are denoted by the same reference signs, and the description thereof is omitted as appropriate below.

In FIG. 10, the quantization section 84 includes comparators 111 and 112 and an output section 113.

Thus, the quantization section 84 of FIG. 10 is similar to the case of FIG. 7 in including the comparator 111. However, the quantization section 84 of FIG. 10 is different from the case of FIG. 7 in newly including the comparator 112 and the output section 113.

The event detecting section 52 (FIG. 5) including the quantization section 84 of FIG. 10 detects, in addition to events, the polarities of changes in light amount that are events.

In the quantization section 84 of FIG. 10, the comparator 111 outputs, in the case where a difference signal is larger than the threshold Vth, the H level indicating 1, as event data indicating the occurrence of an event having the positive polarity. The comparator 111 outputs, in the case where a difference signal is not larger than the threshold Vth, the L level indicating 0, as event data indicating that no event having the positive polarity has occurred.

Further, in the quantization section 84 of FIG. 10, a threshold Vth' (<Vth) is supplied to the non-inverting input terminal (+) of the comparator 112, and difference signals are supplied to the inverting input terminal (−) of the comparator 112 from the subtraction section 83. Here, for the sake of simple description, it is assumed that the threshold Vth' is equal to −Vth, for example.

The comparator 112 compares a difference signal from the subtraction section 83 with the threshold Vth' applied to the inverting input terminal (−), thereby quantizing the difference signal. The comparator 112 outputs, as event data, the quantized value obtained by the quantization.

For example, in a case where a difference signal is smaller than the threshold Vth' (the absolute value of the difference signal having a negative value is larger than the threshold Vth), the comparator 112 outputs the H level indicating 1, as event data indicating the occurrence of an event having the negative polarity. Further, in a case where a difference signal is not smaller than the threshold Vth' (the absolute value of the difference signal having a negative value is not larger than the threshold Vth), the comparator 112 outputs the L level indicating 0, as event data indicating that no event having the negative polarity has occurred.

The output section 113 outputs, on the basis of event data output from the comparators 111 and 112, event data indicating the occurrence of an event having the positive polarity, event data indicating the occurrence of an event having the negative polarity, or event data indicating that no event has occurred to the transfer section 85.

For example, the output section 113 outputs, in a case where event data from the comparator 111 is the H level indicating 1, +V volts indicating +1, as event data indicating the occurrence of an event having the positive polarity, to the transfer section 85. Further, the output section 113 outputs, in a case where event data from the comparator 112 is the H level indicating 1, −V volts indicating −1, as event data indicating the occurrence of an event having the negative polarity, to the transfer section 85. In addition, the output section 113 outputs, in a case where each event data from the comparators 111 and 112 is the L level indicating 0, 0 volts (GND level) indicating 0, as event data indicating that no event has occurred, to the transfer section 85.

The transfer section 85 supplies a request to the arbiter 33 in the case where it is confirmed on the basis of event data from the output section 113 of the quantization section 84 that a change in light amount that is an event having the positive polarity or the negative polarity has occurred. After receiving a response indicating event data output permission, the transfer section 85 outputs event data indicating the occurrence of the event having the positive polarity or the negative polarity (+V volts indicating 1 or −V volts indicating −1) to the output section 35.

In the following, the quantization section 84 is assumed to have the configuration illustrated in FIG. 10 of the configurations of FIG. 7 and FIG. 10, for example.

Another Configuration Example of Pixel Array Section 31

Figure 11:
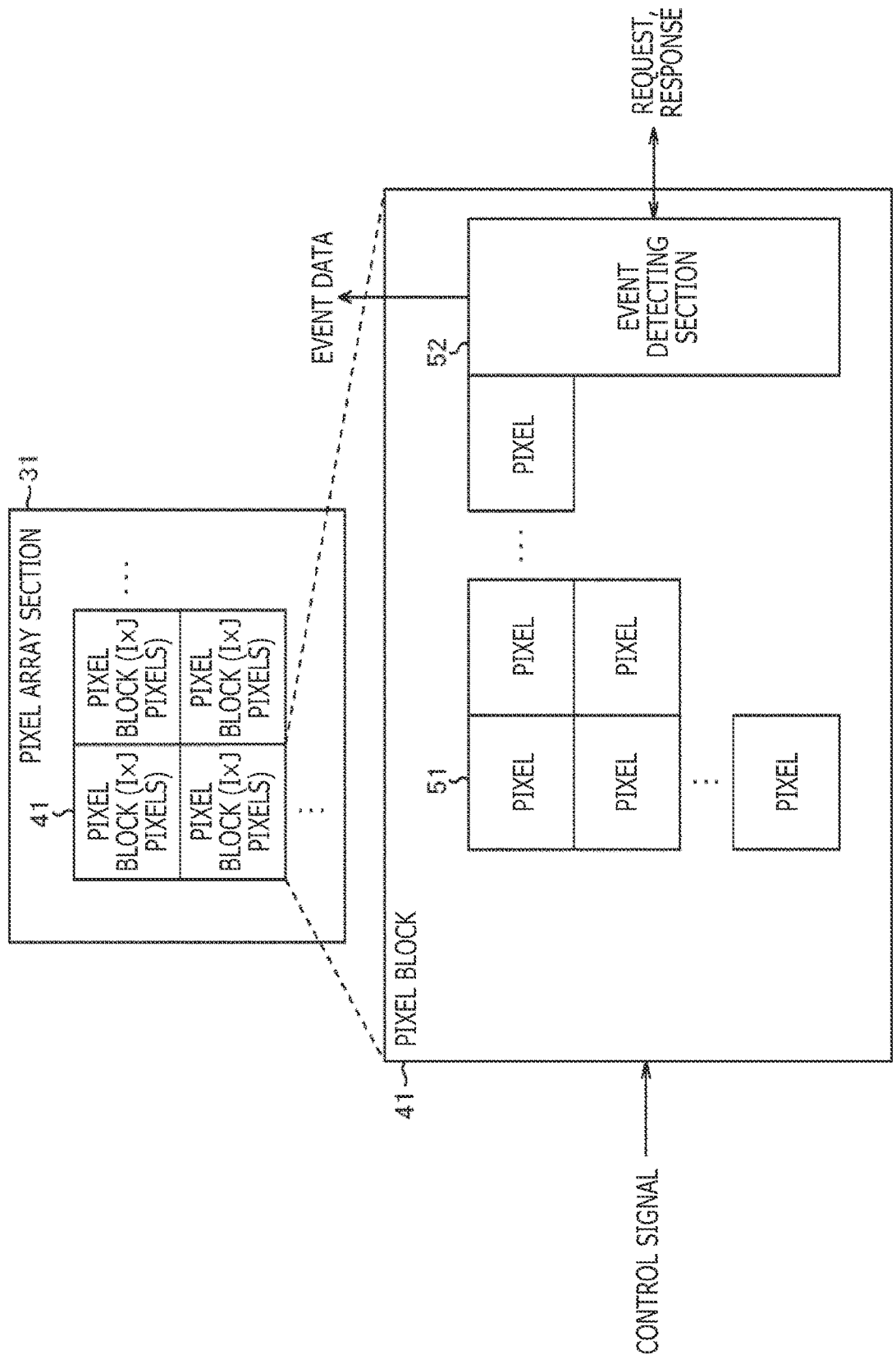
FIG. 11 is a block diagram illustrating another configuration example of the pixel array section 31.

FIG. 11 is a block diagram illustrating another configuration example of the pixel array section 31 of FIG. 2.

Note that, in FIG. 11, parts corresponding to those in the case of FIG. 3 are denoted by the same reference signs, and the description thereof is omitted as appropriate below.

In FIG. 11, the pixel array section 31 includes the plurality of pixel blocks 41. The pixel block 41 includes the I×J pixels 51 that are one or more pixels and the event detecting section 52.

Thus, the pixel array section 31 of FIG. 11 is similar to the case of FIG. 3 in that the pixel array section 31 includes the plurality of pixel blocks 41 and that the pixel block 41 includes one or more pixels 51 and the event detecting section 52. However, the pixel array section 31 of FIG. 11 is different from the case of FIG. 3 in that the pixel block 41 does not include the pixel signal generating section 53.

As described above, in the pixel array section 31 of FIG. 11, the pixel block 41 does not include the pixel signal generating section 53, so that the sensor section 21 (FIG. 2) can be formed without the AD conversion section 34.

Configuration Example of Pixel Block 41

Figure 12:
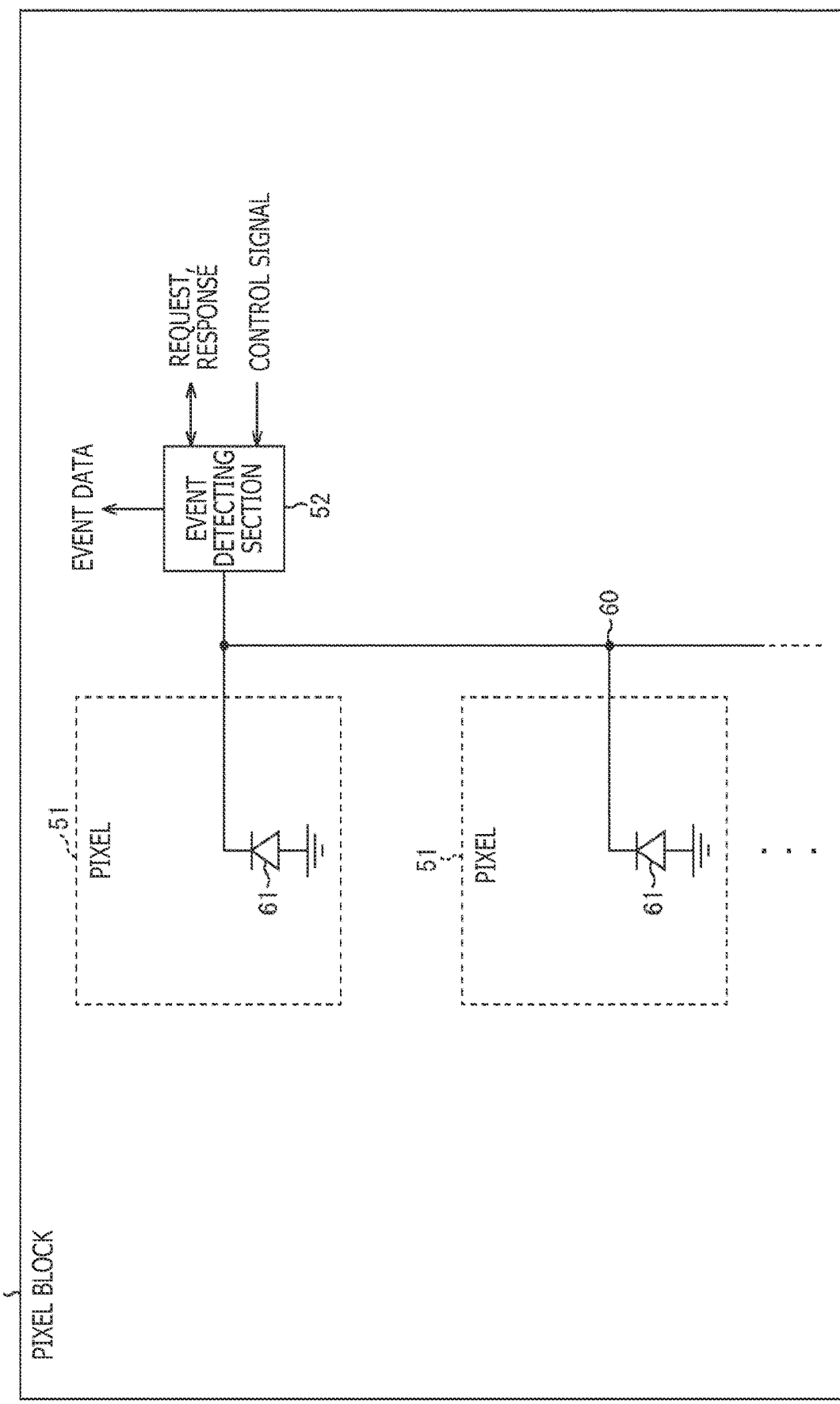
FIG. 12 is a circuit diagram illustrating a configuration example of the pixel block 41.

FIG. 12 is a circuit diagram illustrating a configuration example of the pixel block 41 of FIG. 11.

As described with reference to FIG. 11, the pixel block 41 includes the pixels 51 and the event detecting section 52, but does not include the pixel signal generating section 53.

In this case, the pixel 51 can only include the photoelectric conversion element 61 without the transfer transistors 62 and 63.

Note that, in the case where the pixel 51 has the configuration illustrated in FIG. 12, the event detecting section 52 can output a voltage corresponding to a photocurrent from the pixel 51, as a pixel signal.

Example of Output of Event Data

Figure 13:
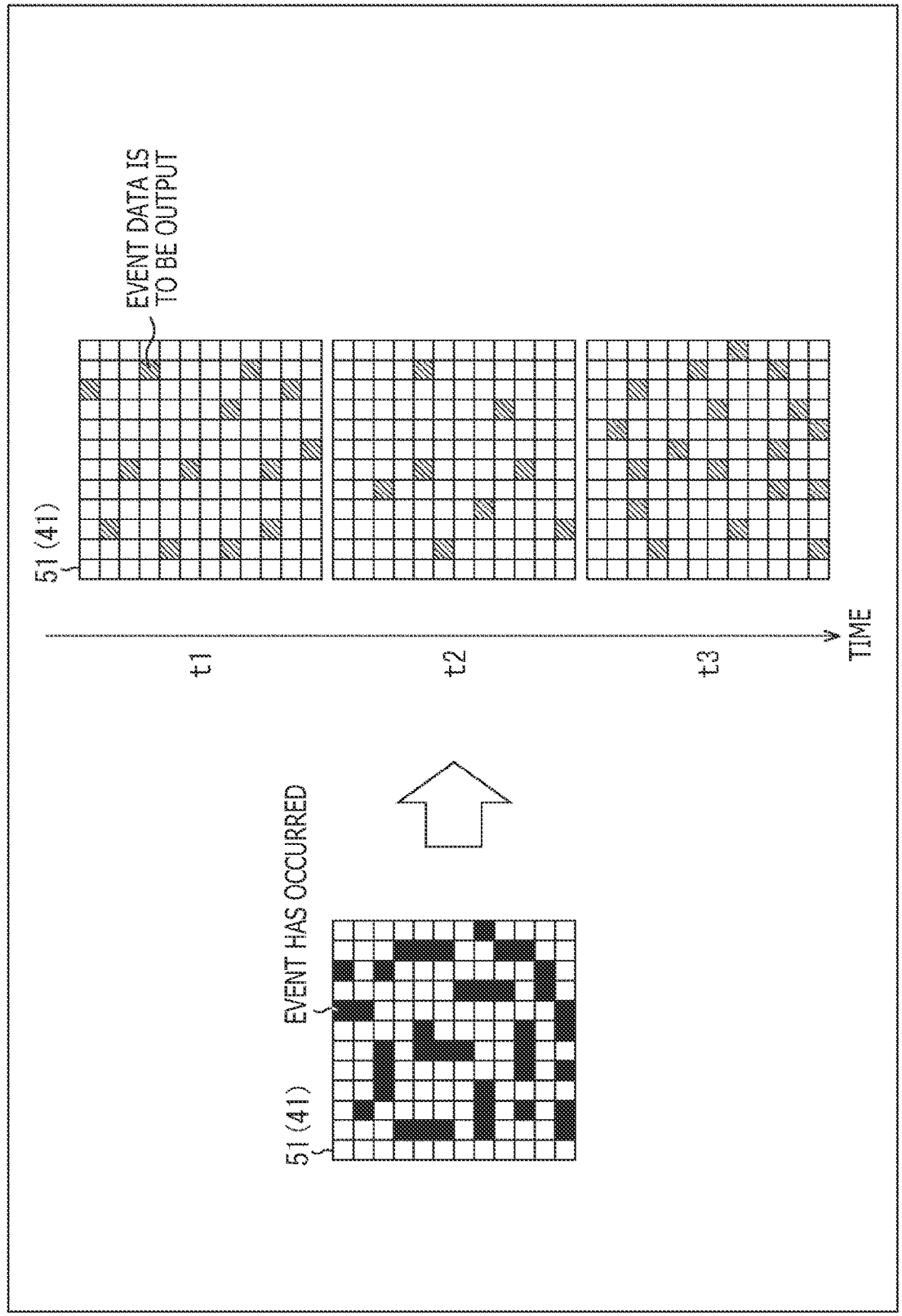
FIG. 13 is a diagram illustrating an example of the output of event data in a case where events have occurred simultaneously in a large number of the pixel blocks 41.

FIG. 13 is a diagram illustrating an example of the output of event data in a case where events have occurred simultaneously in a large number of the pixel blocks 41 (pixels 51).

In the sensor section 21 (FIG. 2), the amount of pieces of event data that are simultaneously output from the pixel array section 31 to the output section 35 (the number of the pixel blocks 41 (event detecting sections 52) that output the event data to the output section 35) is limited due to the wiring, the capacity of transmission, and the like.

That is, when receiving requests from a large number of event detecting sections 52 at the same time, the arbiter 33 (FIG. 2) arbitrates the requests from the large number of event detecting sections 52, and permits a predetermined certain number (or less) of event detecting sections 52 of the large number of event detecting sections 52 to output event data.

Specifically, when receiving requests from the event detecting sections 52 more than the certain number at the same time, the arbiter 33 performs arbitration to select, from the pixel blocks 41 whose event detecting sections 52 have simultaneously output the requests, a certain number of pixel blocks 41 so that the selected pixel blocks 41 are distributed in the pixel array section 31 as uniform as possible, and permits the event detecting sections 52 of the certain number of pixel blocks 41 to output event data.

The arbiter 33 repeats arbitration until all the event detecting sections 52 that have output the requests gain event data output permission.

The event detecting section 52 that has output the request waits the output of event data until the event detecting section 52 gains event data output permission. When gaining event data output permission, the event detecting section 52 outputs the event data to the output section 35.

Thus, in a case where events have simultaneously occurred in a large number of the pixel blocks 41 at a certain time point t1, as illustrated in FIG. 13, some of (the event detecting sections 52 of) the pixel blocks 41 output event data at the time point t1, while some of the pixel blocks 41 output event data at the following time point t2 or t3.

In this case, the event data on the events that have simultaneously occurred includes information regarding different time points. That is, the time point information in the event data may be the time point t1, at which the events have occurred, or the following time point t2 or t3.

When event data on events that have simultaneously occurred includes information regarding (variously) different time points as described above, for example, the recognition performance of object recognition processing that is data processing on frame data obtained from the event data drops.

In the present technology, the switching of the connections between the pixel blocks 41 is controlled so that flexible acquisition of event data such as acquisition of event data in which a difference in time point information is prevented is achieved.

Note that, the present technology is also applicable to the case where the pixel 51 includes the transfer transistors 62 and 63 and the pixel block 41 includes the pixel signal generating section 53, and the case where the pixel block 41 includes a plurality of pixels 51.

However, in the following, for the sake of simple description, unless otherwise noted, the following case is assumed: the pixel block 41 includes the single pixel 51 and the event detecting section 52 but does not include the pixel signal generating section 53, and the pixel 51 does not include the transfer transistors 62 and 63, that is, the pixel block 41 has the configuration of FIG. 11 with the single pixel 51.

<Sensor Chip to which Present Technology has been Applied>

Figure 14:
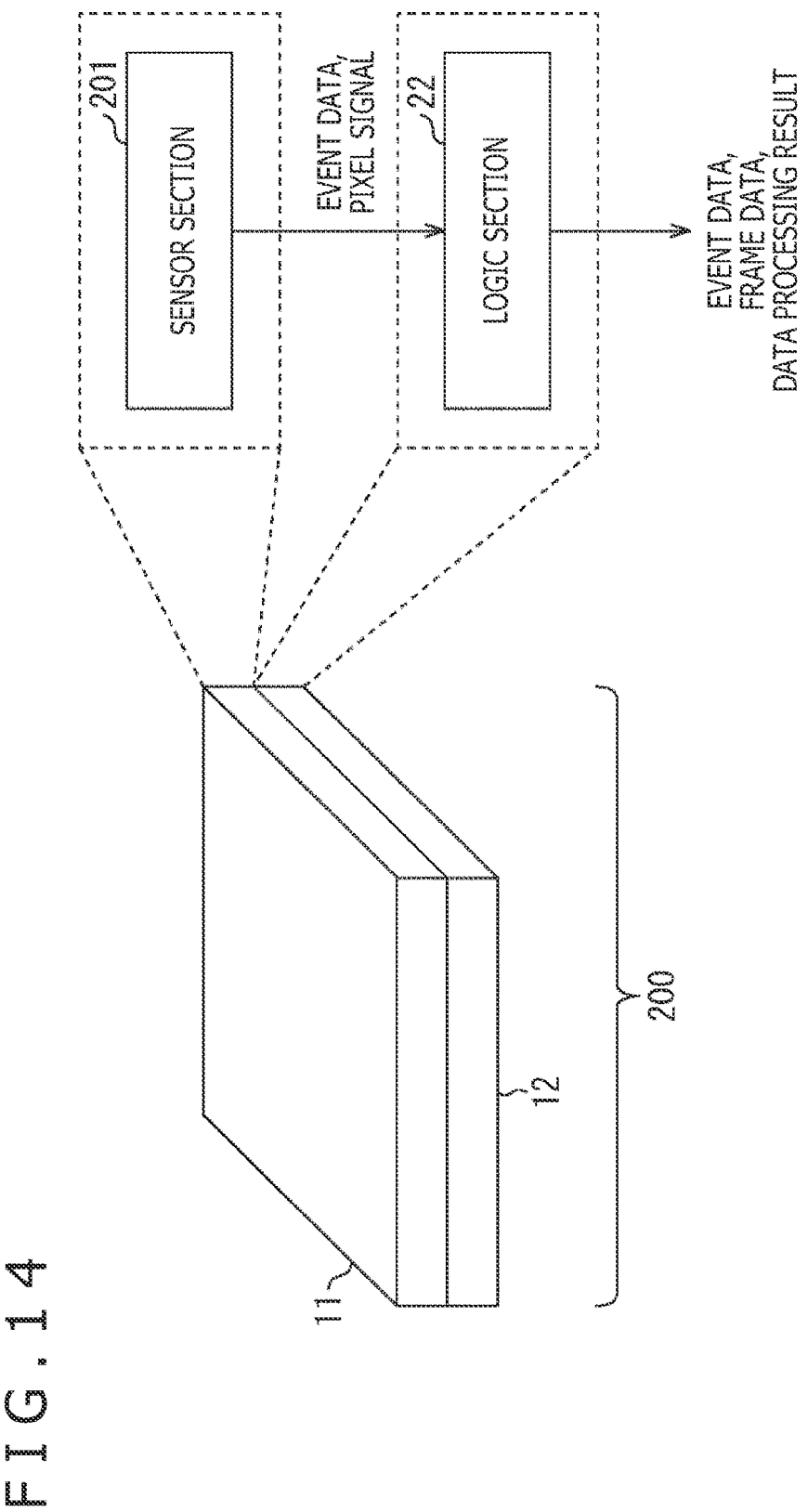
FIG. 14 is a diagram illustrating a configuration example of an embodiment of a sensor chip to which the present technology has been applied.

FIG. 14 is a diagram illustrating a configuration example of an embodiment of a sensor chip to which the present technology has been applied.

Note that, in FIG. 14, parts corresponding to those of the sensor chip 10 of FIG. 1 are denoted by the same reference signs, and the description thereof is omitted as appropriate below.

A sensor chip 200 of FIG. 14 includes the sensor die 11 and the logic die 12 stacked. Further, the sensor die 11 includes a sensor section 201, and the logic die 12 includes the logic section 22.

Thus, the sensor chip 200 of FIG. 14 is similar to the sensor chip 10 of FIG. 1 in that the sensor chip 200 includes the sensor die 11 and the logic die 12 and that the logic die 12 includes the logic section 22. However, the sensor chip 200 is different from the sensor chip 10 in that the sensor die 11 includes the sensor section 201 instead of the sensor section 21.

Configuration Example of Sensor Section 201

Figure 15:
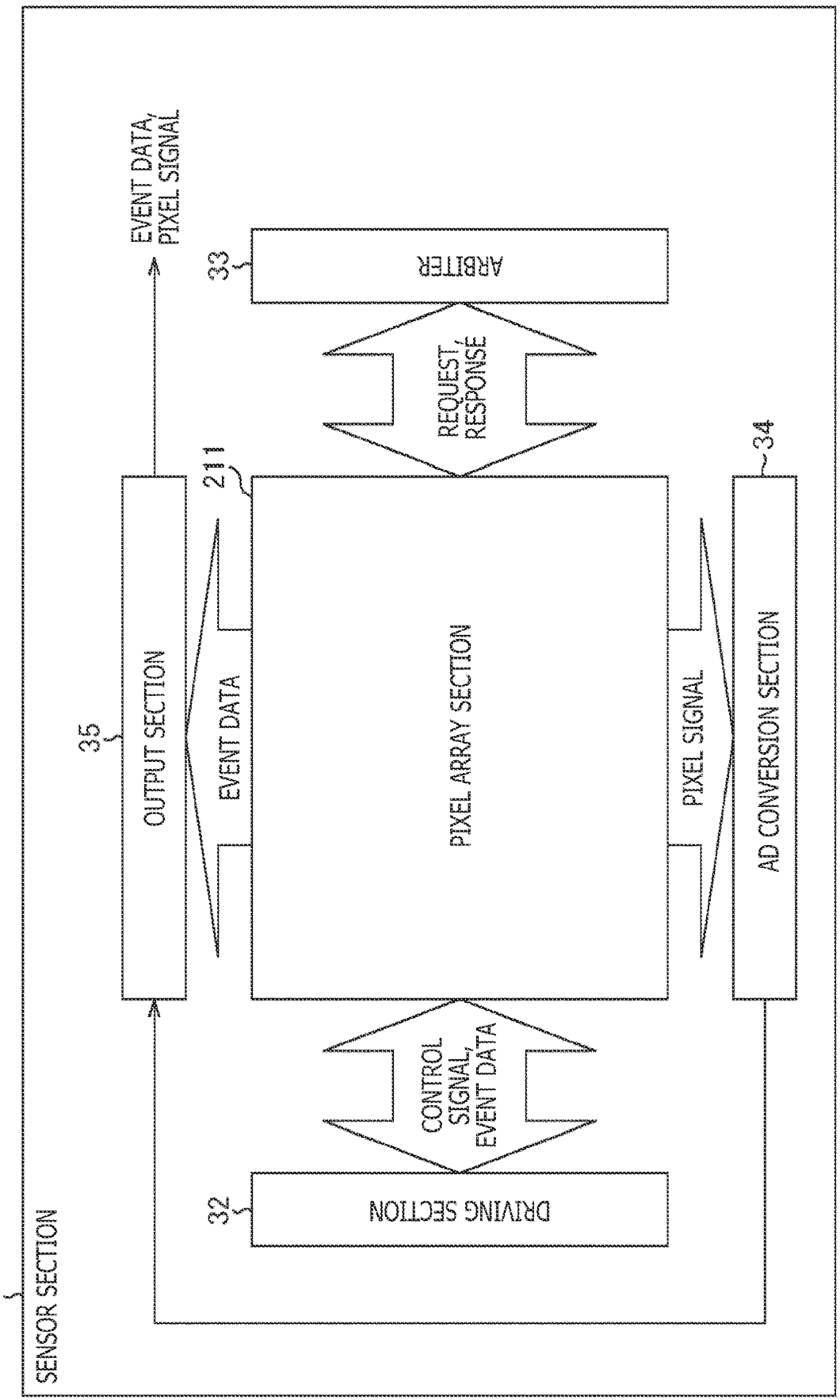
FIG. 15 is a block diagram illustrating a configuration example of a sensor section 201.

FIG. 15 is a block diagram illustrating a configuration example of the sensor section 201 of FIG. 14.

Note that, in FIG. 15, parts corresponding to those of the sensor section 21 of FIG. 2 are denoted by the same reference signs, and the description thereof is omitted as appropriate below.

In FIG. 15, the sensor section 201 includes the driving section 32, the arbiter 33, the AD conversion section 34, the output section 35, and a pixel array section 211.

Thus, the sensor section 201 of FIG. 15 is similar to the sensor section 21 of FIG. 2 in including the driving section 32 to the output section 35. However, the sensor section 201 is different from the sensor section 21 in including the pixel array section 211 instead of the pixel array section 31.

Configuration Example of Pixel Array Section 211

Figure 16:
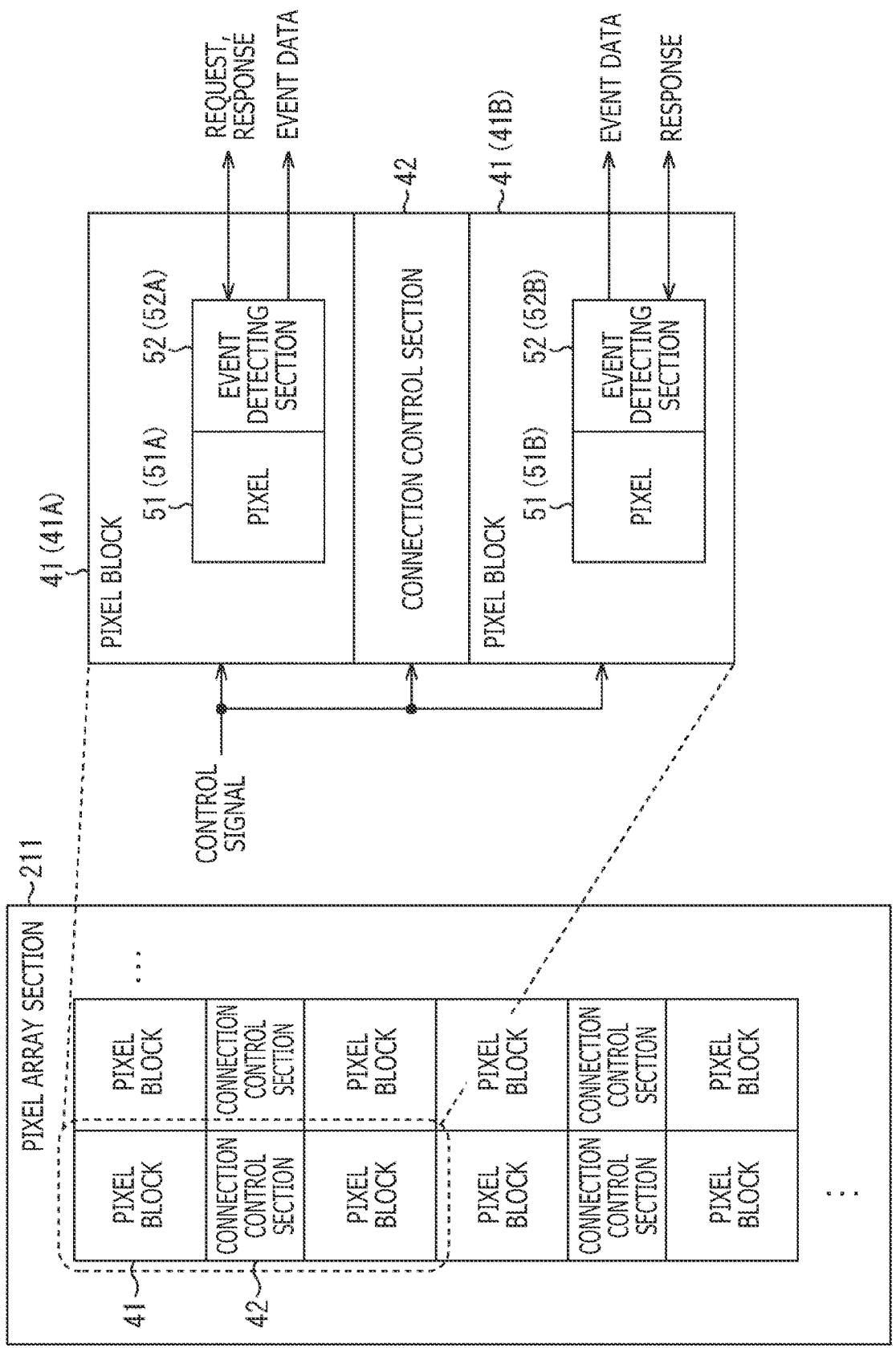
FIG. 16 is a block diagram illustrating a configuration example of a pixel array section 211.

FIG. 16 is a block diagram illustrating a configuration example of the pixel array section 211 of FIG. 15.

Note that, in FIG. 16, parts corresponding to those of the pixel array section 31 of FIG. 3 are denoted by the same reference signs, and the description thereof is omitted as appropriate below.

The pixel array section 211 includes a plurality of pixel blocks 41 and a connection control section 42. The pixel block 41 includes a single pixel 51 and the event detecting section 52.

Thus, the pixel array section 211 is similar to the pixel array section 31 of FIG. 3 in including the plurality of pixel blocks 41 but is different from the pixel array section 31 of FIG. 3 in newly including the connection control section 42.

Further, the pixel block 41 is similar to the case of FIG. 12 in including the single pixel 51 and the event detecting section 52.

The connection control section 42 performs, depending on the operating mode, the connection control of switching the connections between the plurality of pixel blocks 41, for example, the two vertically adjacent pixel blocks 41. That is, in FIG. 16, the connection control section 42 switches the connections between the pixel blocks 41 in odd rows and a certain column and the pixel blocks 41 in rows following the odd rows (even rows) and the same column. In the pixel array section 31, as described above, the number of the connection control sections 42 each configured to switch the connections between the two vertically adjacent pixel blocks 41 is ½ of the number of the pixel blocks 41.

Note that, here, for the sake of simple description, the two vertically adjacent pixel blocks 41 are connected to each other under the control of the connection control section 42. The pixel blocks that are connected to each other under the connection control can be, other than the two vertically adjacent pixel blocks 41, for example, the four pixel blocks 41 (in two rows by two columns), the nine (3×3) pixel blocks, the 16 (4×4) pixel blocks, the four (4×1) pixel blocks, the eight (4×2) pixel blocks, or any plurality of the pixel blocks 41.

Here, one of the two pixel blocks 41 that are connected to each other under the control of the connection control section 42 is also referred to as a "pixel block 41A," and the other is also referred to as a "pixel block 41B." Further, the pixel 51 and the event detecting section 52 of the pixel block 41A are also referred to as a "pixel 51A" and an "event detecting section 52A," respectively, and the pixel 51 and the event detecting section 52 of the pixel block 41B are also referred to as a "pixel 51B" and an "event detecting section 52B," respectively.

Figure 17:
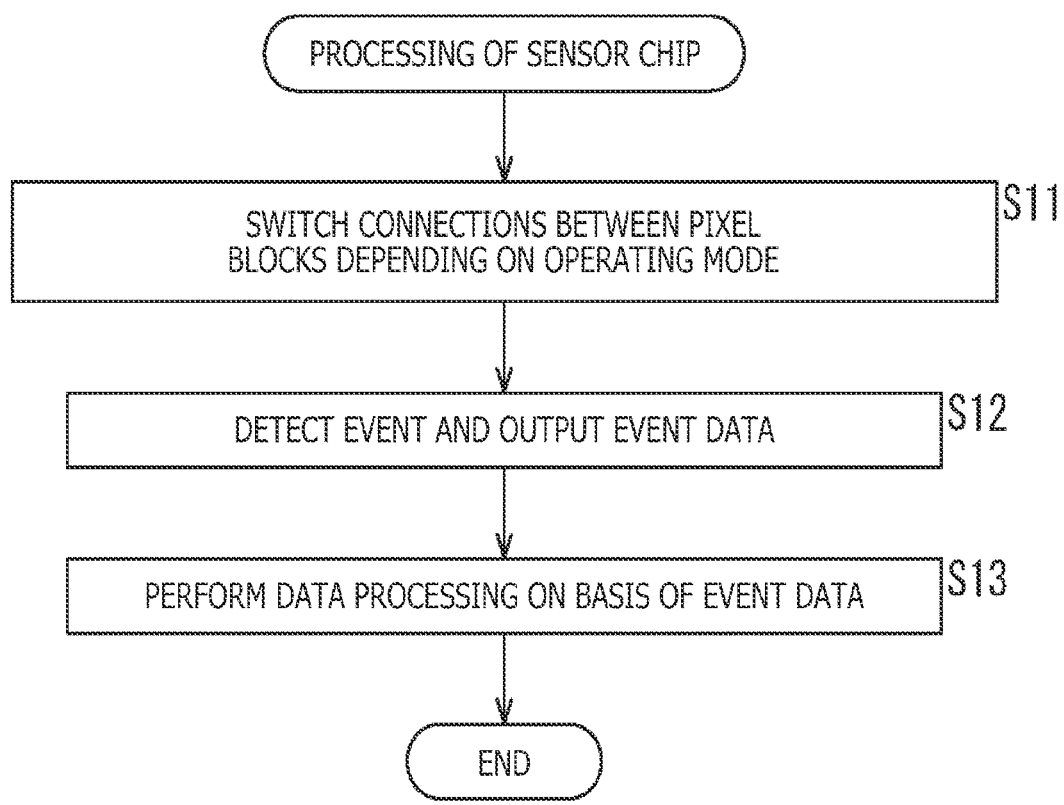
FIG. 17 is a flowchart illustrating an example of the operation of a sensor chip 200.

FIG. 17 is a flowchart illustrating an example of the operation of the sensor chip 200 of FIG. 14.

In Step S11, the connection control section 42 (FIG. 16) switches, depending on the operating mode, the connections between the two pixel blocks 41A and 41B that are connected to each other under the control of the connection control section 42. The processing then proceeds to Step S12.

In Step S12, when an event has occurred, the event detecting section 52 of the pixel block 41 detects the event, so that event data (specifically, a pixel signal from the pixel 51 in which the event has been detected) is output from the sensor section 21 to the logic section 22.

After that, the processing proceeds from Step S12 to Step S13 where the logic section 22 performs, on the basis of the event data from the sensor section 21, data processing such as frame data generation, and outputs the data processing result.

As described above, the connection control section 42 switches the connections between the two pixel blocks 41A and 41B, which are the plurality of pixel blocks 41, so that event data can be flexibly acquired.

First Configuration Example of Connection Control Section 42

Figure 18:
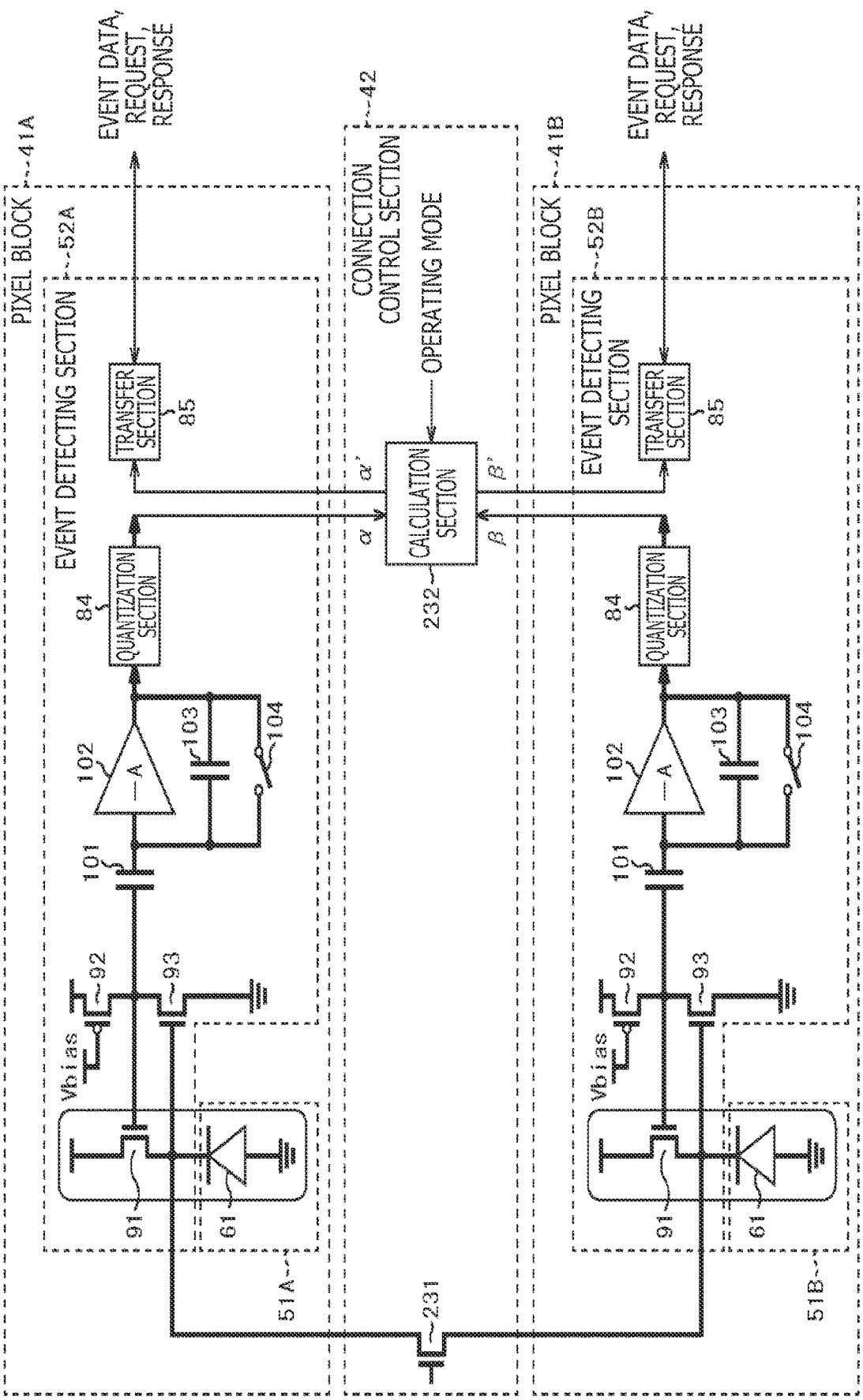
FIG. 18 is a diagram illustrating a first configuration example of a connection control section 42.

FIG. 18 is a diagram illustrating a first configuration example of the connection control section 42 of FIG. 16.

In FIG. 18, the connection control section 42 includes a FET 231 and a calculation section 232.

The FET 231 functions as a switch configured to connect the two pixel blocks 41A and 41B so that photocurrents from the pixels 51A and 51B of the two pixel blocks 41A and 41B are combined.

For example, the FET 231 is turned on or off depending on the operating mode of the connection control section 42, to switch the connections between the source of the transistor (FET) 91 through which a photocurrent from the pixel 51A flows and the source of the transistor 91 through which a photocurrent from the pixel 51B flows.

The connection control section 42 is set to an operating mode specified by the driving section 32 or the arbiter 33, or outside the sensor section 201, for example.

The calculation section 232 receives event data α from the quantization section 84 (of the event detecting section 52A) of the pixel block 41A and event data β from the quantization section 84 (of the event detecting section 52B) of the pixel block 41B.

The calculation section 232 performs, on the event data α from the pixel block 41A and the event data β from the pixel block 41B, calculations based on the operating mode of the connection control section 42. Then, the calculation section 232 supplies new pieces of event data α' and β' obtained by the calculations on the pieces of event data α and β to the respective transfer sections 85 of the pixel blocks 41A and 41B.

Note that, in addition to switching the connections between the pixel blocks 41A and 41B, the connection control section 42 turns on or off the operation of the current-voltage converting section 81 (transistors 91 to 93) by using the bias voltage Vbias that is applied to the transistor 92 of the current-voltage converting section 81 of the event detecting section 52. That is, the connection control section 42 turns on the transistor 92 to turn on the operation of the current-voltage converting section 81 (control the current-voltage converting section 81 to operate) and turns off the transistor 92 to turn off the operation of the current-voltage converting section 81 (stop the operation).

Here, in the first configuration example of the connection control section 42 of FIG. 18, for example, the transistor 92 of the event detecting section 52A, which is one of the event detecting sections 52A and 52B, is always on, and the transistor 92 of the event detecting section 52B, which is the other event detecting section, is turned on or off.

Note that, in FIG. 18, in the event detecting sections 52 (52A and 52B), the illustrations of the buffers 82 are omitted. The same holds true for the following figures.

FIG. 19 is a diagram illustrating the operating modes of the connection control section 42 of FIG. 18.

The operating modes of the connection control section 42 of FIG. 18 include a high resolution (normal) mode, a low resolution mode, and an average current mode.

In the high resolution mode, the FET 231 is turned off, and the transistor 92 of the event detecting section 52B is turned on. Further, the calculation section 232 performs calculation on the basis of a calculation table TL1 described later.

In the low resolution mode, the FET 231 is turned on, and the transistor 92 of the event detecting section 52B is turned off. Further, the calculation section 232 performs calculation on the basis of a calculation table TL2 described later.

In the average current mode, the FET 231 is turned on, and the transistor 92 of the event detecting section 52B is turned on. Further, the calculation section 232 performs calculation on the basis of a calculation table TL3 described later.

FIG. 20 is a diagram illustrating the calculation tables TL1, TL2, and TL3 that are used in calculation by the calculation section 232.

In FIG. 20, A illustrates the calculation table TL1.

With the calculation based on the calculation table TL1, on the basis of the pieces of event data α and β, the pieces of event data α and β are output as they are as the pieces of event data α' and β'.

In FIG. 20, B illustrates the calculation table TL2.

With the calculation based on the calculation table TL2, on the basis of the pieces of event data α and β, the event data α is output as it is as the event data α'. Further, 0 (0 volts) indicating that no event has occurred is output as the event data β'. Thus, in the calculation based on the calculation table TL2, the event data β is subjected to the calculation that limits the output of event data indicating the occurrence of events.

In FIG. 20, C illustrates the calculation table TL3.

With the calculation based on the calculation table TL3, on the basis of the pieces of event data α and β, the calculation result of an expression (α==β? α:0) is output as the event data α'. Further, 0 indicating that no event has occurred is output as the event data β'.

The expression (α==β? α:0) indicates that α is taken in a case where "α is equal to β (α==β)" is true and that 0 is taken in a case where "α is equal to β" is false.

With the calculation based on the calculation table TL3, the event data α (=β) is output as the event data α' in the case where the event data α is equal to the event data β, and 0 indicating that no event has occurred is output as the event data α' in the case where the event data α is not equal to the event data β. Further, 0 indicating that no event has occurred is output as the event data β'. Thus, in the calculation based on the calculation table TL3, the event data α is subjected to the calculation that limits the output of event data indicating the occurrence of events in the case where the event data α is not equal to the event data β, and the event data β is always subjected to the calculation that limits the output of event data indicating the occurrence of events.

Figure 21:
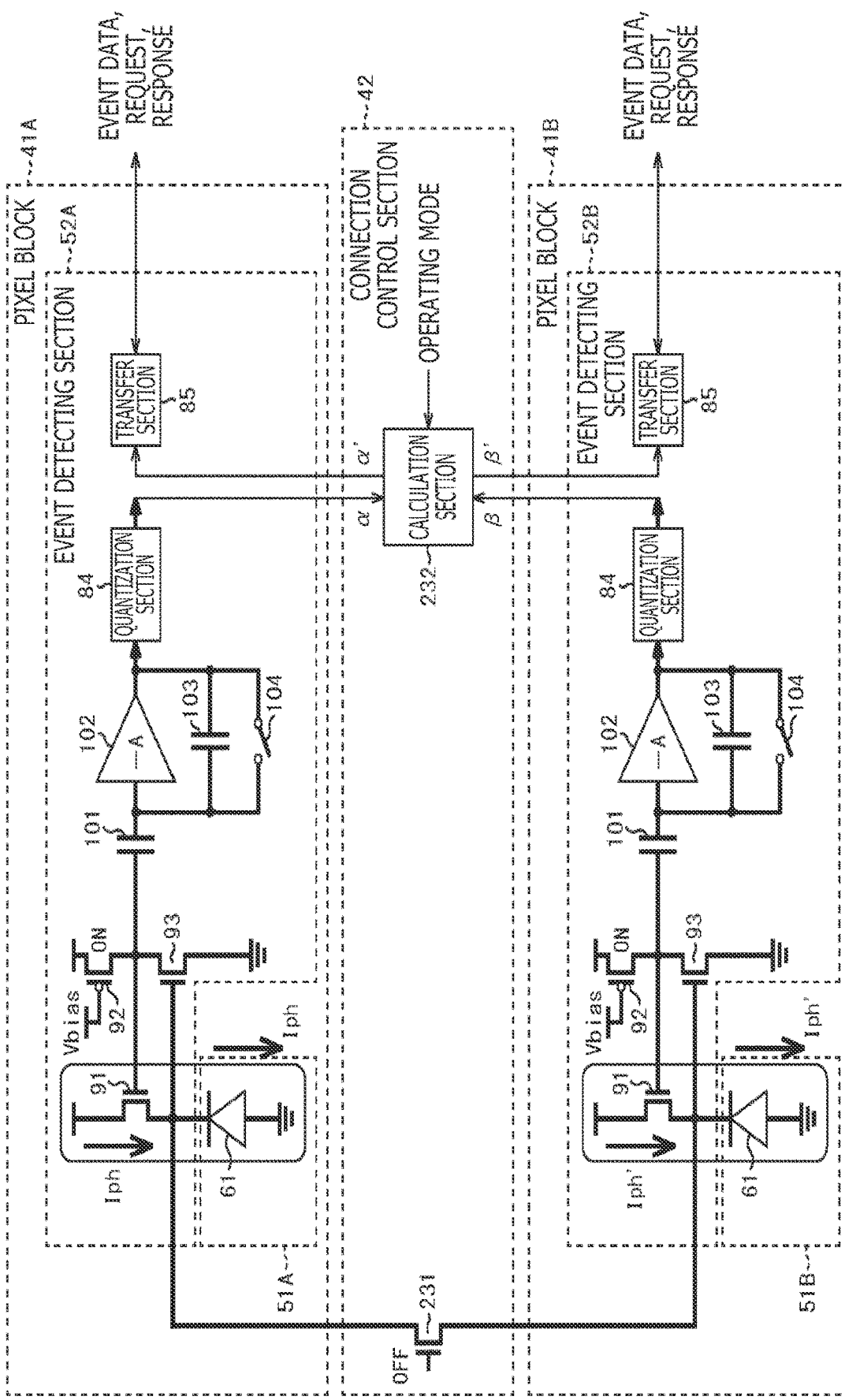
FIG. 21 is a diagram illustrating the flow of photocurrents in a case where the connection control section 42 is in the operating mode of a high resolution mode.

FIG. 21 is a diagram illustrating the flow of photocurrents in a case where the connection control section 42 of FIG. 18 is in the operating mode of the high resolution mode.

In the connection control section 42 of FIG. 18, the transistor 92 of the event detecting section 52A is always on. Further, in the case where the connection control section 42 is in the operating mode of the high resolution mode, the FET 231 is turned off, and the transistor 92 of the event detecting section 52B is turned on.

Thus, in the high resolution mode, the connection between the pixel blocks 41A and 41B is cut, so that the event detecting section 52A of the pixel block 41A and the event detecting section 52B of the pixel block 41B operate individually.

Further, in the high resolution mode, the calculation section 232 performs the calculation based on the calculation table TL1 (FIG. 20), so that the pieces of event data α and β are supplied, as they are, to the respective transfer sections 85 of the event detecting sections 52A and 52B, as the pieces of event data α' and β'.

As a result, the pixel blocks 41A and 41B operate as in the case where the connection control section 42 is not provided, and the pixel array section 211 can output, as event data indicating the occurrence of events, event data at a high resolution corresponding to the number of the pixel blocks 41 of the pixel array section 211.

Here, when photocurrents generated in (the photoelectric conversion elements 61 of) the pixel 51A and the pixel 51B are denoted by Iph and Iph', in the high resolution mode, the photocurrent Iph generated in the pixel 51A flows through the transistor 91 of the event detecting section 52A, and the photocurrent Iph' generated in the pixel 51B flows through the transistor 91 of the event detecting section 52B.

Figure 22:
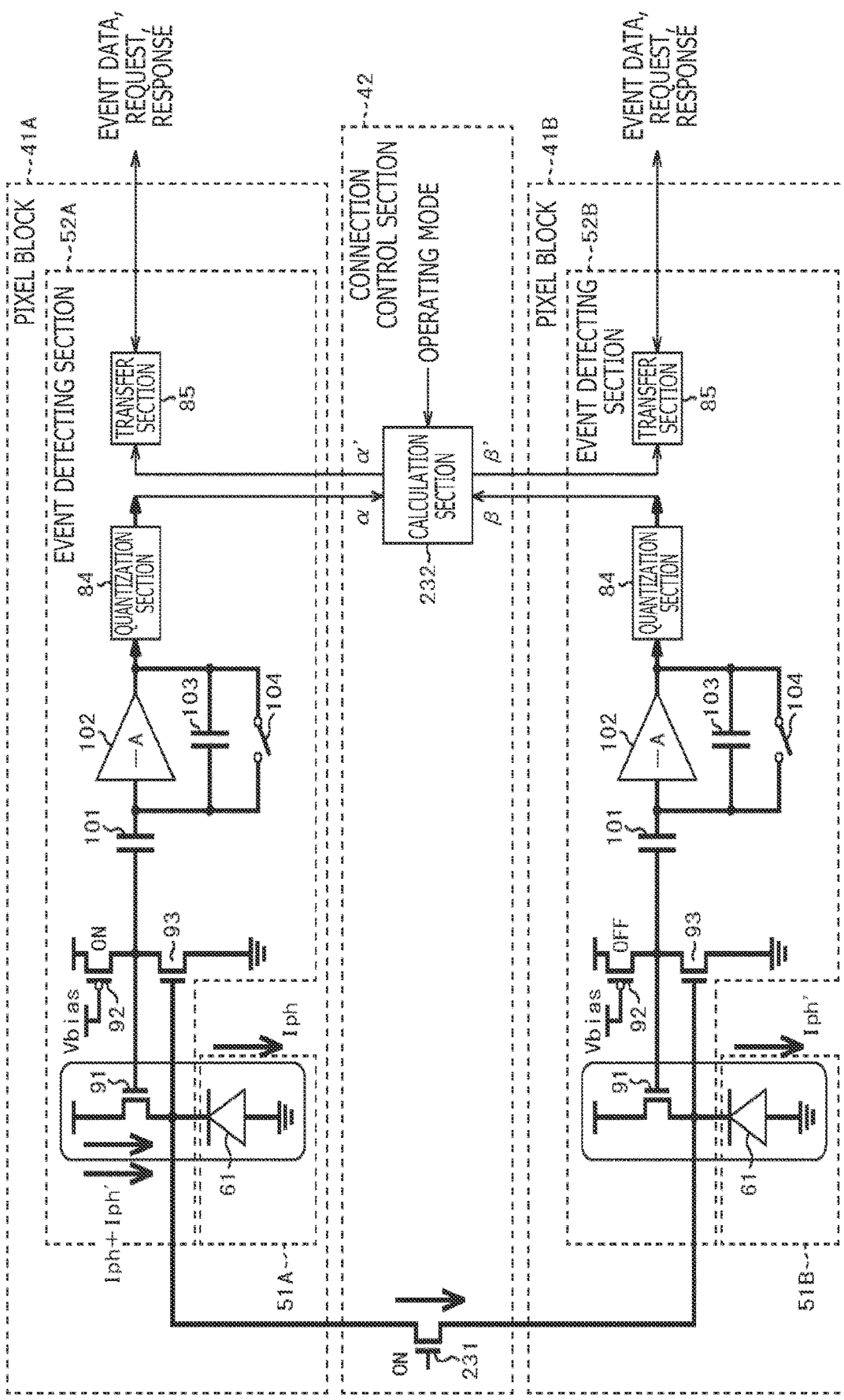
FIG. 22 is a diagram illustrating the flow of the photocurrents in a case where the connection control section 42 is in the operating mode of a low resolution mode.

FIG. 22 is a diagram illustrating the flow of the photocurrents in a case where the connection control section 42 of FIG. 18 is in the operating mode of the low resolution mode.

In the connection control section 42 of FIG. 18, the transistor 92 of the event detecting section 52A is always on. Further, in the case where the connection control section 42 is in the operating mode of the low resolution mode, the FET 231 is turned on, and the transistor 92 of the event detecting section 52B is turned off.

Thus, in the low resolution mode, the pixel blocks 41A and 41B are connected to each other. That is, the source of the transistor 91 of the pixel block 41A is connected to the source of the transistor 91 of the pixel block 41B, so that the pixel blocks 41A and 41B are connected to each other.

In addition, in the low resolution mode, the transistor 92 of the event detecting section 52B is turned off, so that the operation of the current-voltage converting section 81 (transistors 91 to 93) of the event detecting section 52B is turned off.

Further, in the low resolution mode, the calculation section 232 performs the calculation based on the calculation table TL2 (FIG. 20), so that the event data α is output as it is, as the event data α'. As the event data β', 0 indicating that no event has occurred is always output. Then, the pieces of event data α' and β' are supplied to the respective transfer sections 85 of the event detecting sections 52A and 52B.

As a result, of the pixel blocks 41A and 41B, only the pixel block 41A outputs event data indicating the occurrence of events, and the pixel block 41B always outputs event data indicating that no event has occurred (does not output event data indicating the occurrence of events).

Thus, the pixel array section 211 can output, as event data indicating the occurrence of events, event data at a resolution corresponding to ½ of the number of the pixel blocks 41 of the pixel array section 211. That is, in the low resolution mode, the resolution (maximum amount) of event data indicating the occurrence of events is ½ of that in the case of the high resolution mode.

As described above, in the low resolution mode, the amount of event data indicating the occurrence of events (the number of the pixel blocks 41 that output the event data) can be reduced. Thus, in the low resolution mode, a situation where a large number of events occur simultaneously can be prevented as compared to the high resolution mode, with the result that a difference in time point information in event data described with reference to FIG. 13 can be prevented.

Further, in the low resolution mode, the source of the transistor 91 of the pixel block 41A is connected to the source of the transistor 91 of the pixel block 41B, and the operation of the current-voltage converting section 81 (transistors 91 to 93) of the event detecting section 52B is turned off, so that an added value Iph+iph' of the photocurrent Iph generated in the pixel 51A and the photocurrent Iph' generated in the pixel 51B flows through the transistor 91 of the event detecting section 52A as a combined current obtained by combining the photocurrent Iph generated in the pixel 51A and the photocurrent Iph' generated in the pixel 51B.

As a result, the shot noise is relatively reduced, so that the S/N of signals that are handled by the current-voltage converting section 81 (transistors 91 to 93) of the event detecting section 52A can be increased to be √2 times as large as that in the case of the high resolution mode, and the reliability of event detection can thus be enhanced. In addition, the operation of the current-voltage converting section 81 (transistors 91 to 93) of the event detecting section 52B is turned off, so that the power consumption can be reduced.

FIG. 23 is a diagram illustrating the flow of the photocurrents in a case where the connection control section 42 of FIG. 18 is in the operating mode of the average current mode.

In the connection control section 42 of FIG. 18, the transistor 92 of the event detecting section 52A is always on. Further, in the case where the connection control section 42 is in the operating mode of the average current mode, the FET 231 is turned on, and the transistor 92 of the event detecting section 52B is turned on.

Thus, in the average current mode, the pixel blocks 41A and 41B are connected to each other. That is, the source of the transistor 91 of the pixel block 41A is connected to the source of the transistor 91 of the pixel block 41B, so that the pixel blocks 41A and 41B are connected to each other.

In addition, in the average current mode, the transistor 92 of the event detecting section 52B is turned on, so that the operation of the current-voltage converting section 81 (transistors 91 to 93) of the event detecting section 52B is turned on. Thus, the operation of the current-voltage converting sections 81 of both the event detecting sections 52A and 52B is turned on.

Further, in the average current mode, the calculation section 232 performs the calculation based on the calculation table TL3 (FIG. 20) so that the event data α (=β) is output as the event data α', in the case where the event data α is equal to the event data β, and 0 indicating that no event has occurred is output as the event data α', in the case where the event data α is not equal to the event data β. As the event data β', 0 indicating that no event has occurred is always output. Then, the pieces of event data α' and β' are supplied to the respective transfer sections 85 of the event detecting sections 52A and 52B.

As a result, of the pixel blocks 41A and 41B, only the pixel block 41A outputs event data indicating the occurrence of events, and the pixel block 41B always outputs event data indicating that no event has occurred (does not output event data indicating the occurrence of events).

Thus, the pixel array section 211 can output, as event data indicating the occurrence of events, event data at a resolution corresponding to ½ of the number of the pixel blocks 41 of the pixel array section 211. That is, in the average current mode, as in the low resolution mode, the resolution (maximum amount) of event data indicating the occurrence of events is ½ of that in the case of the high resolution mode.

As described above, in the average current mode, the amount of event data indicating the occurrence of events (the number of the pixel blocks 41 that output the event data) can be reduced. Thus, in the average current mode, as in the low resolution mode, a situation where a large number of events occur simultaneously can be prevented, with the result that a difference in time point information in event data described with reference to FIG. 13 can be prevented.

Further, in the average current mode, the source of the transistor 91 of the pixel block 41A is connected to the source of the transistor 91 of the pixel block 41B, and the operation of the current-voltage converting sections 81 (transistors 91 to 93) of the event detecting sections 52A and 52B is turned on, so that an average value of the photocurrent Iph generated in the pixel 51A and the photocurrent Iph' generated in the pixel 51B flows through the transistors 91 of the event detecting sections 52A and 52B, as a combined current obtained by combining the photocurrent Iph generated in the pixel 51A and the photocurrent Iph' generated in the pixel 51B.

As a result, the noise is reduced, so that the S/N of signals that are handled by the current-voltage converting section 81 (transistors 91 to 93) of the event detecting section 52A can be enhanced, and the reliability of event detection can thus be enhanced.

In addition, in the average current mode, with the calculation based on the calculation table TL3 (FIG. 20), in the case where the event data α is equal to the event data β, the pieces of event data α and @ which are equal to each other are output as the event data α', so that the reliability of event data (indicating the occurrence of events) can be enhanced.

Here, a value equal to or smaller than the maximum amount of event data to which the arbiter 33 can give simultaneous output permission is referred to as a "first threshold," and a value equal to or smaller than the first threshold is referred to as a "second threshold." In the first configuration example of the connection control section 42 of FIG. 18, for example, when the number of events takes a value equal to or larger than the first threshold in the case where the operating mode is the high resolution mode, the operating mode can be set to the low resolution mode or the average current mode. Further, the connection control section 42 can be set to the operating mode of the high resolution mode when, for example, the number of events takes a value equal to or smaller than the second threshold in the case where the operating mode is the low resolution mode or the average current mode.

Second Configuration Example of Connection Control Section 42

FIG. 24 is a diagram illustrating a second configuration example of the connection control section 42 of FIG. 16.

Note that, in FIG. 24, parts corresponding to those in the case of FIG. 18 are denoted by the same reference signs, and the description thereof is omitted as appropriate below.

In FIG. 24, the connection control section 42 includes the FET 231, the calculation section 232, and a FET 233.

Thus, the connection control section 42 of FIG. 24 is similar to the case of FIG. 18 in including the FET 231 and the calculation section 232. However, the connection control section 42 of FIG. 24 is different from the case of FIG. 18 in newly including the FET 233.

The FET 233 functions as a switch configured to connect the two pixel blocks 41A and 41B so that photovoltages corresponding to the photocurrents from the pixels 51A and 51B of the pixel blocks 41A and 41B are combined.

For example, the FET 233 is turned on or off depending on the operating mode of the connection control section 42 to switch the connections between the gate of the transistor (FET) 91 through which a photocurrent from the pixel 51A flows and the gate of the transistor 91 through which a photocurrent from the pixel 51B flows.

Note that, in the second configuration example of the connection control section 42 of FIG. 24, as in the first configuration example, the operation of the current-voltage converting section 81 (transistors 91 to 93) is turned on or off with the bias voltage Vbias that is applied to the transistor 92 of the current-voltage converting section 81 of the event detecting section 52.

That is, in the second configuration example of the connection control section 42, as in the first configuration example, for example, the transistor 92 of the event detecting section 52A, which is one of the event detecting sections 52A and 52B, is always on, and the transistor 92 of the event detecting section 52B, which is the other event detecting section, is turned on or off.

FIG. 25 is a diagram illustrating the operating modes of the connection control section 42 of FIG. 24.

The operating modes of the connection control section 42 of FIG. 24 include the high resolution mode, the low resolution mode, and an average current and voltage mode.

In the high resolution mode, as described with reference to FIG. 19, the FET 231 is turned off, and the transistor 92 of the event detecting section 52B is turned on. The calculation section 232 performs calculation on the basis of the calculation table TL1. In addition, the FET 233 is turned off.

Thus, the pixel blocks 41A and 41B operate as in the case of FIG. 21. As a result, as described with reference to FIG. 21, as event data indicating the occurrence of events, event data at a high resolution corresponding to the number of the pixel blocks 41 of the pixel array section 211 can be output.

In the low resolution mode, as described with reference to FIG. 19, the FET 231 is turned on, and the transistor 92 of the event detecting section 52B is turned off. The calculation section 232 performs calculation on the basis of the calculation table TL2. In addition, the FET 233 is turned off.

Thus, the pixel blocks 41A and 41B operate as in the case of FIG. 22. As a result, as described with reference to FIG. 22, a situation where a large number of events occur simultaneously can be prevented, and a difference in time point information in event data can be prevented. Further, the S/N of signals that are handled by the current-voltage converting section 81 of the event detecting section 52A can be enhanced, and the reliability of event detection can thus be enhanced. In addition, the power consumption can be reduced.

In the average current and voltage mode, as in the average current mode of FIG. 19, the FET 231 is turned on, and the transistor 92 of the event detecting section 52B is turned on. The calculation section 232 performs calculation on the basis of the calculation table TL3. In addition, the FET 233 is turned on.

Thus, in the average current and voltage mode, the pixel blocks 41A and 41B are connected to each other.

That is, in the average current and voltage mode, as in the average current mode, the source of the transistor 91 of the pixel block 41A is connected to the source of the transistor 91 of the pixel block 41B, so that the pixel blocks 41A and 41B are connected to each other. In addition, in the average current mode, the gate of the transistor 91 of the pixel block 41A is connected to the gate of the transistor 91 of the pixel block 41B, so that the pixel blocks 41A and 41B are connected to each other.

Further, in the average current and voltage mode, as in the average current mode, the transistor 92 of the event detecting section 52B is turned on, so that the operation of the current-voltage converting section 81 (transistors 91 to 93) of the event detecting section 52B is turned on. Thus, the operation of the current-voltage converting sections 81 of both the event detecting sections 52A and 52B is turned on.

In addition, in the average current and voltage mode, the calculation section 232 performs the calculation based on the calculation table TL3 (FIG. 20), so that the event data α (=β) is output as the event data α', in the case where the event data α is equal to the event data β, and 0 indicating that no event has occurred is output as the event data α', in the case where the event data α is not equal to the event data β. As the event data β', 0 indicating that no event has occurred is always output. Then, the pieces of event data α' and β' are supplied to the respective transfer sections 85 of the event detecting sections 52A and 52B.

As a result, of the pixel blocks 41A and 41B, only the pixel block 41A outputs event data indicating the occurrence of events, and the pixel block 41B always outputs event data indicating that no event has occurred (does not output event data indicating the occurrence of events).

Thus, the pixel array section 211 can output, as event data indicating the occurrence of events, event data at a resolution corresponding to ½ of the number of the pixel blocks 41 of the pixel array section 211. That is, in the average current and voltage mode, as in the low resolution mode, the resolution (maximum amount) of event data indicating the occurrence of events is ½ of that in the case of the high resolution mode.

As described above, in the average current and voltage mode, the amount of event data indicating the occurrence of events (the number of the pixel blocks 41 that output the event data) can be reduced. Thus, in the average current and voltage mode, as in the low resolution mode, a situation where a large number of events occur simultaneously can be prevented, with the result that a difference in time point information in event data described with FIG. 13 can be prevented.

Further, in the average current and voltage mode, as in the average current mode, the source of the transistor 91 of the pixel block 41A is connected to the source of the transistor 91 of the pixel block 41B and the operation of the current-voltage converting sections 81 (transistors 91 to 93) of the event detecting sections 52A and 52B is turned on, so that an average value of the photocurrent Iph generated in the pixel 51A and the photocurrent Iph' generated in the pixel 51B flows through the transistors 91 of the event detecting sections 52A and 52B, as a combined current obtained by combining the photocurrent Iph generated in the pixel 51A and the photocurrent Iph' generated in the pixel 51B.

In addition, in the average current and voltage mode, the gate of the transistor 91 of the pixel block 41A is connected to the gate of the transistor 91 of the pixel block 41B and the operation of the current-voltage converting sections 81 (transistors 91 to 93) of the event detecting sections 52A and 52B is turned on, so that an average value of a photovoltage generated at the gate of the transistor 91 of the pixel block 41A and a photovoltage generated at the gate of the transistor 91 of the pixel block 41B is applied to the capacitors 101 (of the subtraction sections 83) of the event detecting sections 52A and 52B.

As a result, in the average current and voltage mode, the noise is reduced as compared to the case of the average current mode, and hence the S/N of signals that are handled by the current-voltage converting section 81 (transistors 91 to 93) of the event detecting section 52A can be further enhanced. Further, the reliability of event detection can be further enhanced.

In addition, in the average current and voltage mode, as in the average current mode, with the calculation based on the calculation table TL3 (FIG. 20), in the case where the event data α is equal to the event data β, the pieces of event data α and β which are equal to each other are output as the event data α', so that the reliability of event data can be enhanced.

Here, in the second configuration example of the connection control section 42 of FIG. 24, for example, when the number of events takes a value equal to or larger than the first threshold in the case where the operating mode is the high resolution mode, the operating mode can be set to the low resolution mode or the average current and voltage mode. Further, the connection control section 42 can be set to the operating mode of the high resolution mode when, for example, the number of events takes a value equal to or smaller than the second threshold in the case where the operating mode is the low resolution mode or the average current and voltage mode.

Third Configuration Example of Connection Control Section 42

Figure 26:
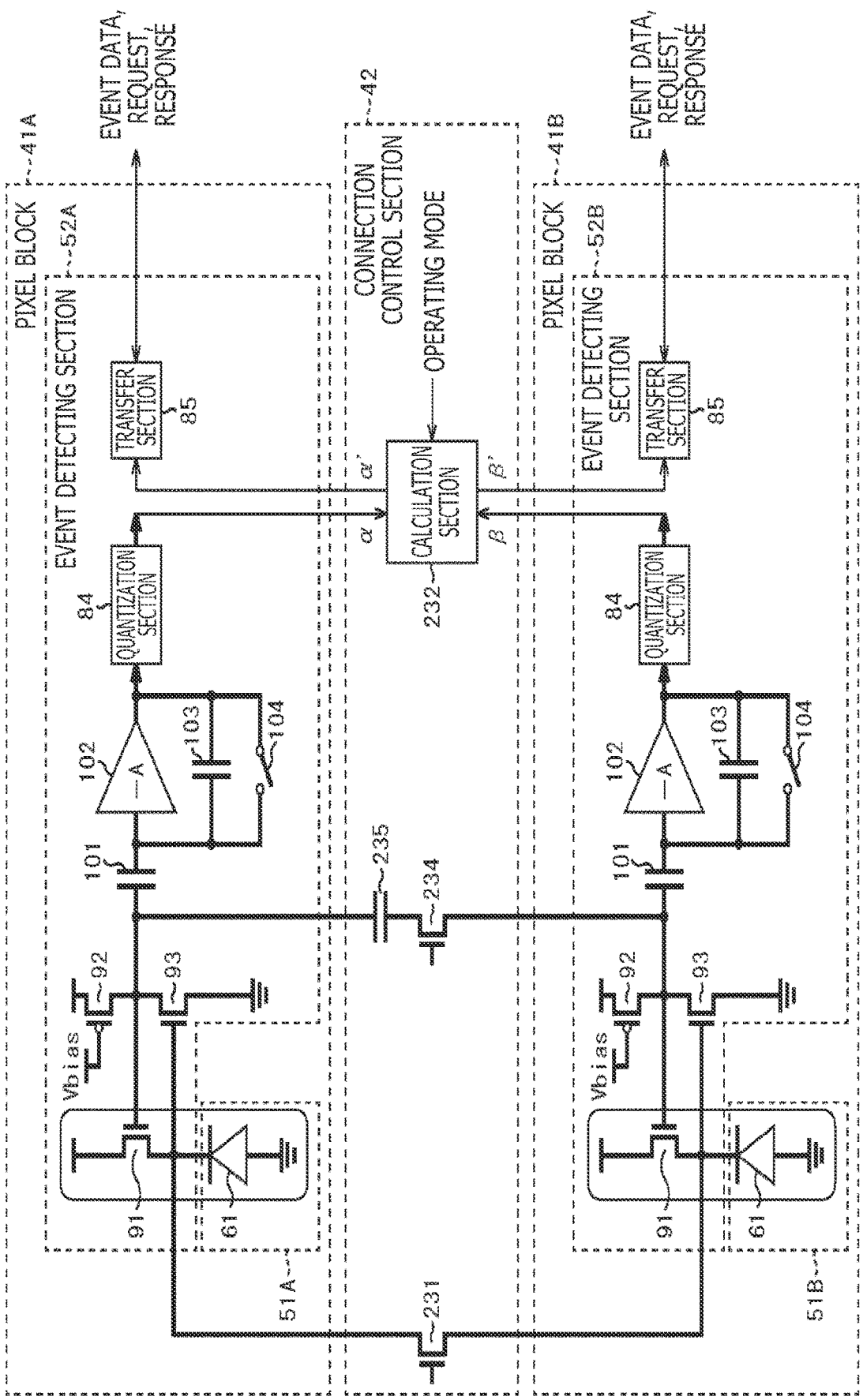
FIG. 26 is a diagram illustrating a third configuration example of the connection control section 42.

FIG. 26 is a diagram illustrating a third configuration example of the connection control section 42 of FIG. 16.

Note that, in FIG. 26, parts corresponding to those in the case of FIG. 18 are denoted by the same reference signs, and the description thereof is omitted as appropriate below.

In FIG. 26, the connection control section 42 includes the FET 231, the calculation section 232, a FET 234, and a capacitor 235.

Thus, the connection control section 42 of FIG. 26 is similar to the case of FIG. 18 in including the FET 231 and the calculation section 232. However, the connection control section 42 of FIG. 26 is different from the case of FIG. 18 in newly including the FET 234 and the capacitor 235.

The FET 234 functions as a switch configured to switch the connections between the connecting point between the capacitor 101 (first capacitor) and the capacitor 103 (second capacitor) (of the subtraction section 83) of the pixel block 41A, which is one of the two pixel blocks 41A and 41B, and the gate of the transistor (FET) 91 (of the current-voltage converting section 81) of the pixel block 41B, which is the other pixel block, through the capacitor 235 (third capacitor).

The FET 234 is turned on or off depending on the operating mode of the connection control section 42, to switch the connections between the connecting point between the capacitors 101 and 103 of the pixel block 41A and the gate of the transistor 91 of the pixel block 41B, through the capacitor 235.

The capacitor 235 has, for example, the same capacitance as the capacitor 101. The one end of the capacitor 235 is connected to the input terminal of the operational amplifier 102 of the pixel block 41A, like the capacitor 101. The other end of the capacitor 235 is connected to the gate of the transistor 91 of the pixel block 41B through the FET 234.

Thus, in a case where the FET 234 is on, a photovoltage generated at the gate of the transistor 91 of the pixel block 41A and a photovoltage generated at the gate of the transistor 91 of the pixel block 41B are respectively applied to the capacitor 101 and the capacitor 235 which are connected to the input terminal of the operational amplifier 102 of the subtraction section 83 in the event detecting section 52A of the pixel block 41A. As a result, the subtraction section 83 of the event detecting section 52A obtains a difference signal for an average value of the photovoltage generated at the gate of the transistor 91 of the pixel block 41A and the photovoltage generated at the gate of the transistor 91 of the pixel block 41B.

Note that, the connection control section 42 of FIG. 26 turns on or off the operation of the current-voltage converting section 81 (transistors 91 to 93) with the bias voltage Vbias that is applied to the transistor 92 of the current-voltage converting section 81 of the event detecting section 52.

That is, the connection control section 42 turns on the transistor 92 to turn on the operation of the current-voltage converting section 81 (control the current-voltage converting section 81 to operate), and turns off the transistor 92 to turn off the operation of the current-voltage converting section 81 (stop the operation).

In the third configuration example of the connection control section 42 of FIG. 26, the transistors 92 of the event detecting sections 52A and 52B are turned on or off.

FIG. 27 is a diagram illustrating the operating modes of the connection control section 42 of FIG. 26.

The operating modes of the connection control section 42 of FIG. 26 include the high resolution mode, the low resolution mode, the average current mode, and a high resolution and high S/N mode.

In the high resolution mode, as described with reference to FIG. 19, the FET 231 is turned off, and the transistor 92 of the event detecting section 52B is turned on. The calculation section 232 performs calculation on the basis of the calculation table TL1. In addition, the FET 234 is turned off, and the transistor 92 of the event detecting section 52A is turned on.

Thus, the pixel blocks 41A and 41B operate as in the case of FIG. 21. As a result, as described with reference to FIG. 21, as event data indicating the occurrence of events, event data at a high resolution corresponding to the number of the pixel blocks 41 of the pixel array section 211 can be output.

The low resolution mode of the connection control section 42 of FIG. 26 includes a mode A and a mode B.

In the mode A, as in the case of the low resolution mode described with reference to FIG. 19, the FET 231 is turned on, and the transistor 92 of the event detecting section 52B is turned off. The calculation section 232 performs calculation on the basis of the calculation table TL2. In addition, the FET 234 is turned off, and the transistor 92 of the event detecting section 52A is turned on.

Thus, the pixel blocks 41A and 41B operate as in the case of FIG. 22.

In the mode B, the FET 231 is turned on, and the transistor 92 of the event detecting section 52B is turned on. The calculation section 232 performs calculation on the basis of the calculation table TL2. In addition, the FET 234 is turned off, and the transistor 92 of the event detecting section 52A is turned off. Note that, in the mode B, the calculation based on the calculation table TL2 uses event data from the pixel block 52A, as the event data β, and uses event data from the pixel block 52B, as the event data α.

Thus, the pixel block 41A operates as the pixel block 41B of FIG. 22, and the pixel block 41B operates as the pixel block 41A of FIG. 22.

As a result, in both the mode A and the mode B, as described with reference to FIG. 22, a situation where a large number of events occur simultaneously can be prevented, and a difference in time point information in event data can be prevented. Further, the S/N of signals that are handled by the current-voltage converting section 81 of the event detecting section 52A or 52B can be enhanced, and the reliability of event detection can thus be enhanced. In addition, the power consumption can be reduced.

In the average current mode, as described with reference to FIG. 19, the FET 231 is turned on, and the transistor 92 of the event detecting section 52B is turned on. The calculation section 232 performs calculation on the basis of the calculation table TL3. In addition, the FET 234 is turned off, and the transistor 92 of the event detecting section 52A is turned on.

Thus, the pixel blocks 41A and 41B operate as in the case of FIG. 23. As a result, as described with reference to FIG. 23, a situation where a large number of events occur simultaneously can be prevented, and a difference in time point information in event data can be prevented. Further, the S/N of signals that are handled by the current-voltage converting section 81 of the event detecting section 52A can be enhanced, and the reliability of event detection can thus be enhanced. In addition, the reliability of event data can be enhanced.

In the high resolution and high S/N mode, the FET 231 is turned off, and the transistor 92 of the event detecting section 52B is turned on. The calculation section 232 performs calculation on the basis of the calculation table TL1. In addition, the FET 234 is turned on, and the transistor 92 of the event detecting section 52A is turned on.

Thus, in the high resolution and high S/N mode, the pixel blocks 41A and 41B are connected to each other.

That is, in the high resolution and high S/N mode, the connecting point between the capacitors 101 and 103 of the pixel block 41A is connected to the gate of the transistor 91 of the pixel block 41B through the capacitor 235.

Further, in the high resolution and high S/N mode, the transistors 92 of the event detecting sections 52A and 52B are turned on, so that the operation of the current-voltage converting sections 81 (transistors 91 to 93) of the event detecting sections 52A and 52B is turned on. Thus, the operation of the current-voltage converting sections 81 of both the event detecting sections 52A and 52B is turned on.

In this case, as described with reference to FIG. 26, a photovoltage generated at the gate of the transistor 91 of the pixel block 41A and a photovoltage generated at the gate of the transistor 91 of the pixel block 41B are respectively applied to the capacitor 101 and the capacitor 235 which are connected to the input terminal of the operational amplifier 102 of the subtraction section 83 in the event detecting section 52A of the pixel block 41A.

As a result, the subtraction section 83 (capacitor 101 to switch 104) of the event detecting section 52A obtains a difference signal for an average value of the photovoltage generated at the gate of the transistor 91 of the pixel block 41A and the photovoltage generated at the gate of the transistor 91 of the pixel block 41B.

Further, in the high resolution and high S/N mode, the calculation section 232 performs calculation on the basis of the calculation table TL1 (FIG. 20), so that the pieces of event data α and β are supplied, as they are, to the respective transfer sections 85 of the event detecting sections 52A and 52B, as the pieces of event data α' and β'.

Thus, the pixel array section 211 can output, as in the high resolution mode, as event data indicating the occurrence of events, event data at a high resolution corresponding to the number of the pixel blocks 41 of the pixel array section 211.

In addition, in the high resolution and high S/N mode, the subtraction section 83 of the event detecting section 52A obtains a difference signal for an average value of a photovoltage generated at the gate of the transistor 91 of the pixel block 41A and a photovoltage generated at the gate of the transistor 91 of the pixel block 41B, so that the noise of signals that are handled by the subtraction section 83 can be reduced. As a result, the S/N of the signals that are handled by the subtraction section 83 of the event detecting section 52A can be further enhanced, and hence the reliability of event detection can be further enhanced.

Note that, in the high resolution and high S/N mode, in a case where the pixels 51A and 51B are provided with color filters of different colors, the event detecting section 52A can detect, as an event, a change in light obtained by combining light beams of different colors (the colors of the color filters provided to the pixels 51A and 51B) (light near white light). Meanwhile, the event detecting section 52B can detect, as an event, a change in light of the color of the color filter provided to the pixel 51B.

Further, the third configuration example of the connection control section 42 of FIG. 26 can be formed without the FET 231. However, in the case where the connection control section 42 is formed without the FET 231, the connection control section 42 can only have the operating modes of the high resolution mode and the high resolution and high S/N mode.

Here, in the third configuration example of the connection control section 42 of FIG. 26, for example, when the number of events takes a value equal to or larger than the first threshold in the case where the operating mode is the high resolution mode or the high resolution and high S/N mode, the operating mode can be set to the low resolution mode or the average current mode. Further, the connection control section 42 can be set to the operating mode of the high resolution mode or the high resolution and high S/N mode when, for example, the number of events takes a value equal to or smaller than the second threshold in the case where the operating mode is the low resolution mode or the average current mode.

<Relation Between Operating Mode of Connection Control Section 42 and Pixel Block 41 in which Event May Occur>

Figure 28:
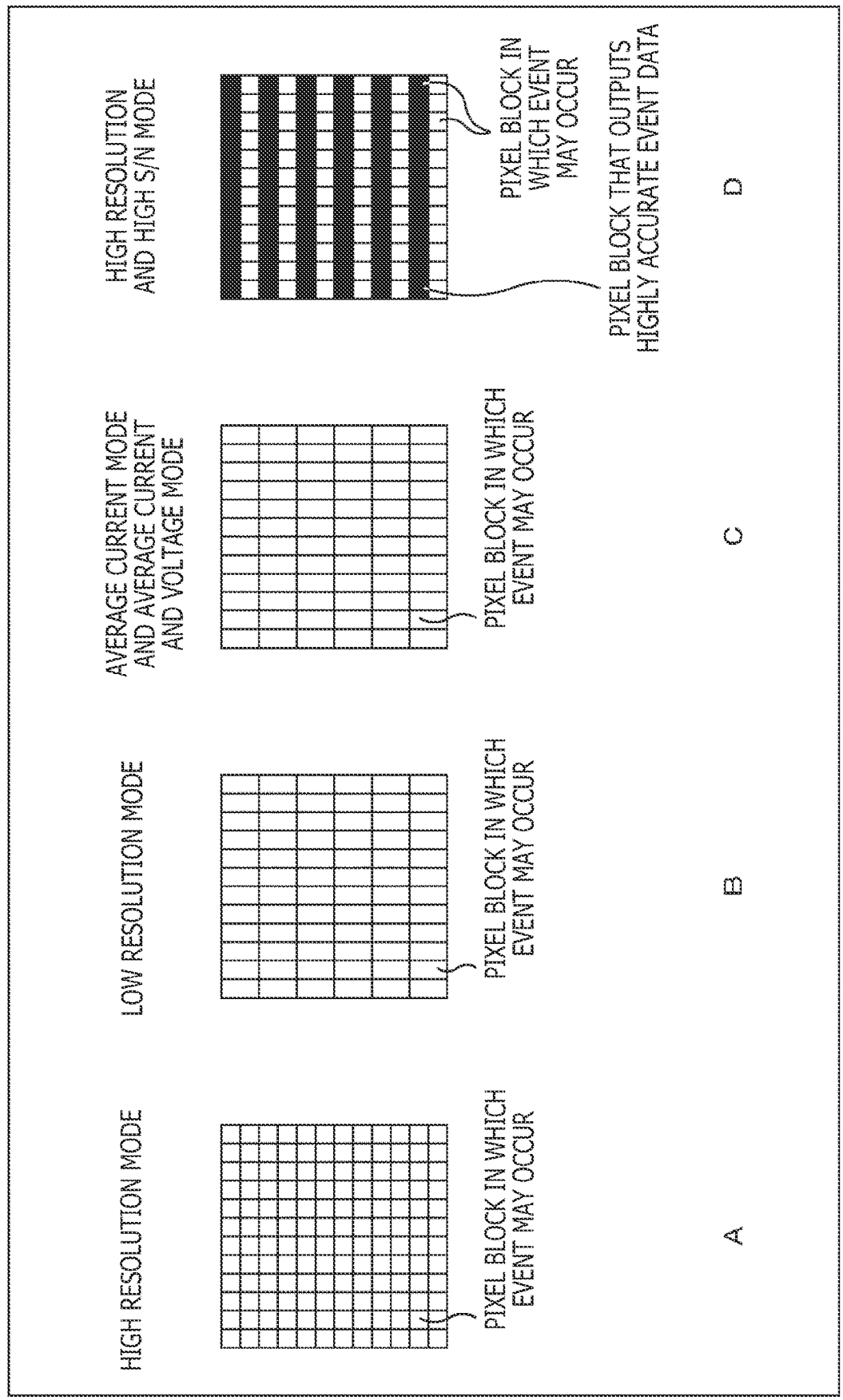
FIG. 28 depicts diagram illustrating relations between the operating modes of the connection control section 42 and the pixel blocks 41 in which events may occur.

FIG. 28 depicts diagrams illustrating relations between the operating modes of the connection control section 42 and the pixel blocks 41 in which events may occur.

In FIG. 28, A schematically illustrates the pixel blocks 41 in which events may occur in the high resolution mode.

In the high resolution mode, event data at a high resolution corresponding to the number of the pixel blocks 41 of the pixel array section 211 can be output.

In FIG. 28, B schematically illustrates the pixel blocks 41 in which events may occur in the low resolution mode.

In the low resolution mode, the resolution (maximum amount) of event data indicating the occurrence of events can be a low resolution that is ½ of that in the case of the high resolution mode. That is, for example, in a case where the connection control section 42 switches the connections between the vertically adjacent pixel blocks 41A and 41B, the vertical resolution of event data indicating the occurrence of events can be ½ of that in the case of the high resolution mode. In addition, a difference in time point information in event data can be prevented. Further, the S/N of signals that are handled by the current-voltage converting section 81 can be enhanced, so that highly accurate event data can be output.

In FIG. 28, C schematically illustrates the pixel blocks 41 in which events may occur in the average current mode and the average current and voltage mode.

In the average current mode and the average current and voltage mode, as in the low resolution mode, the resolution of event data indicating the occurrence of events can be a low resolution that is ½ of that in the case of the high resolution mode. In addition, a difference in time point information in event data can be prevented. Further, the S/N of signals that are handled by the current-voltage converting section 81 and the subtraction section 83 can be enhanced, so that more highly accurate event data can be output.

In FIG. 28, D schematically illustrates the pixel blocks 41 in which events may occur in the high resolution and high S/N mode.

In the high resolution and high S/N mode, as in the high resolution mode, event data at a high resolution corresponding to the number of the pixel blocks 41 of the pixel array section 211 can be output. In addition, some of the pixel blocks 41 can output highly accurate event data. That is, for example, in the case where the connection control section 42 switches the connections between the vertically adjacent pixel blocks 41A and 41B, in the pixel blocks 41A in every other row, the S/N of signals that are handled is enhanced, so that highly accurate event data can be output.

<Pixel Blocks 41 that are Connected to Each Other Under Connection Control>

Figure 29:
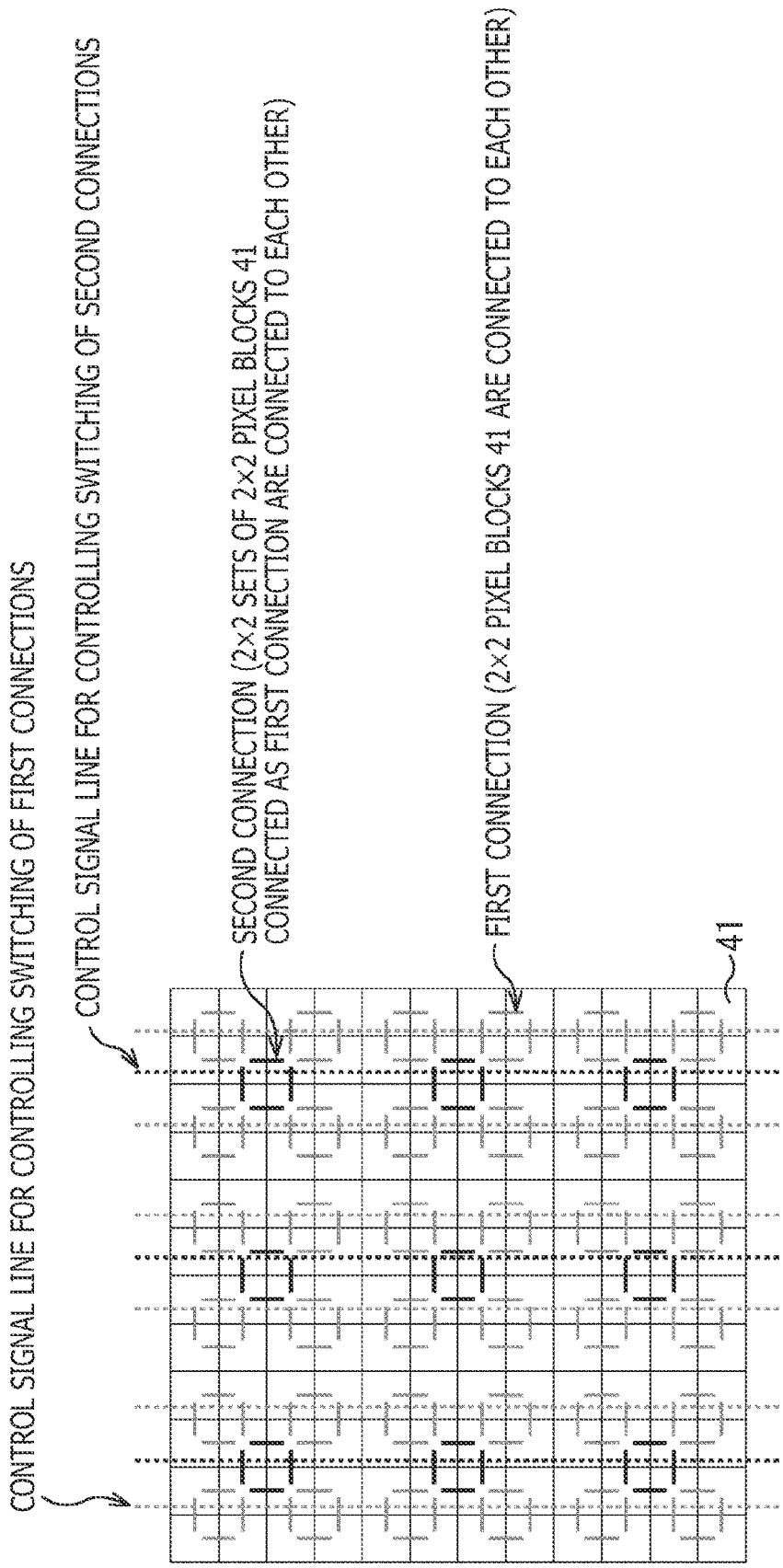
FIG. 29 is a diagram illustrating a first example of the pixel blocks 41 that are connected to each other under the control of the connection control section 42.

FIG. 29 is a diagram illustrating a first example of the pixel blocks 41 that are connected to each other under the control of the connection control section 42.

In the above, the connections between the two vertically adjacent pixel blocks 41 are switched under the connection control of the connection control section 42, but a plurality of pixel blocks other than the two vertically adjacent pixel blocks 41 can be connected to each other under the connection control.

FIG. 29 illustrates an example in which the pixel blocks 41 are connected to each other while the aspect ratio is maintained.

In FIG. 29, as a first connection, the pixel blocks 41 (in two rows by two columns) are connected to each other. In addition, as a second connection, the 2×2 sets of the 2×2 pixel blocks 41 connected as the first connection are connected to each other. Further, in FIG. 29, control signal lines for controlling the switching of the first connections (whether or not to connect the pixel blocks 41 as the first connections in units of 2×2 pixel blocks) and control signal lines for controlling the switching of the second connections are wired in the column direction.

In FIG. 29, in a case where the first connections and the second connections are cut, the resolution of event data indicating the occurrence of events (the number of the pixel blocks 41 that may output the event data) is a high resolution of 12×12. In a case where the first connections are established and the second connections are cut, the resolution of event data indicating the occurrence of events is a low resolution of 6×6. In a case where the first connections and the second connections are established, the resolution of event data indicating the occurrence of events is a lower resolution of 3×3.

By increasing, in addition to switching the first connections and the second connections of FIG. 29, the ways of connections between the pixel blocks 41 and the number of connection control lines for controlling the connections, a lower resolution can be achieved as the resolution of event data indicating the occurrence of events.

Figure 30:
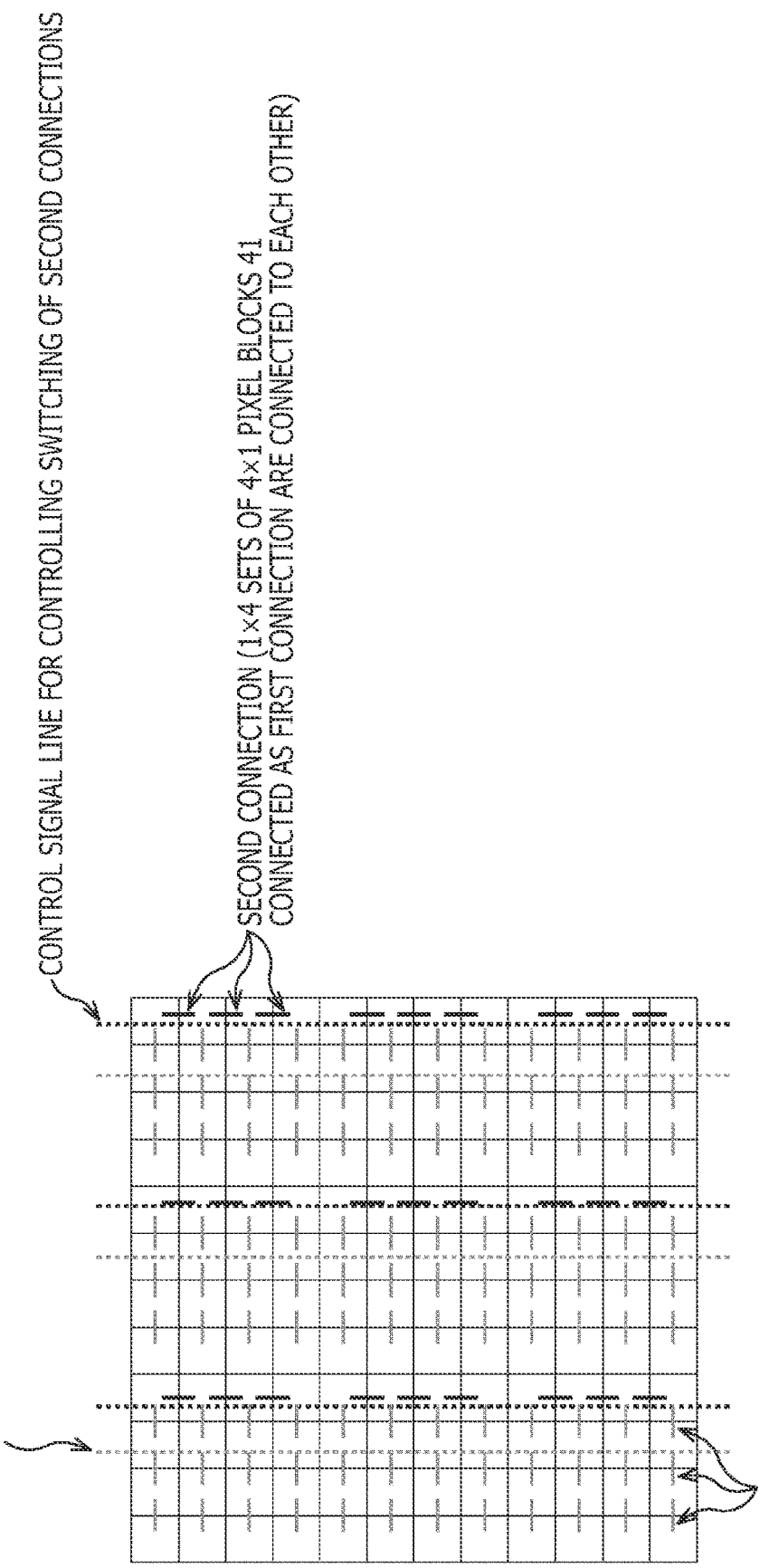
FIG. 30 is a diagram illustrating a second example of the pixel blocks 41 that are connected to each other under the control of the connection control section 42.

FIG. 30 is a diagram illustrating a second example of the pixel blocks 41 that are connected to each other under the control of the connection control section 42.

FIG. 30 illustrates the example in which the pixel blocks 41 are connected to each other to change the aspect ratio.

In FIG. 30, as a first connection, the pixel blocks 41 (in four rows by one column) are connected to each other. In addition, as a second connection, the 1×4 sets of the 4×1 pixel blocks 41 connected as the first connection are connected to each other. Further, in FIG. 30, control signal lines for controlling the switching of the first connections and control signal lines for controlling the switching of the first connections are wired in the column direction.

In FIG. 30, in a case where the first connections and the second connections are cut, the resolution of event data indicating the occurrence of events is a high resolution of 12×12. In a case where the first connections are established and the second connections are cut, the resolution of event data indicating the occurrence of events is a low resolution of 3×12. In a case where the first connections and the second connections are established, the resolution of event data indicating the occurrence of events is a lower resolution of 3×3.

By increasing, in addition to switching the first connections and the second connections of FIG. 30, the ways of connections between the pixel blocks 41 and the number of connection control lines for controlling the connections, a lower resolution can be achieved as the resolution of event data indicating the occurrence of events.

As described above, according to the present technology, in the sensor chip 10 including the pixel blocks 41 each including the pixels 51 and the event detecting section 52 configured to detect events that are changes in electrical signal of the pixels 51, the connections between the plurality of pixel blocks 41 are switched, so that event data can be flexibly acquired, for example, event data at high resolution is acquired in a case where there are few events, and event data at low resolution is acquired in a case where there are many events.

Another Configuration Example of Event Detecting Section 52

Figure 31:
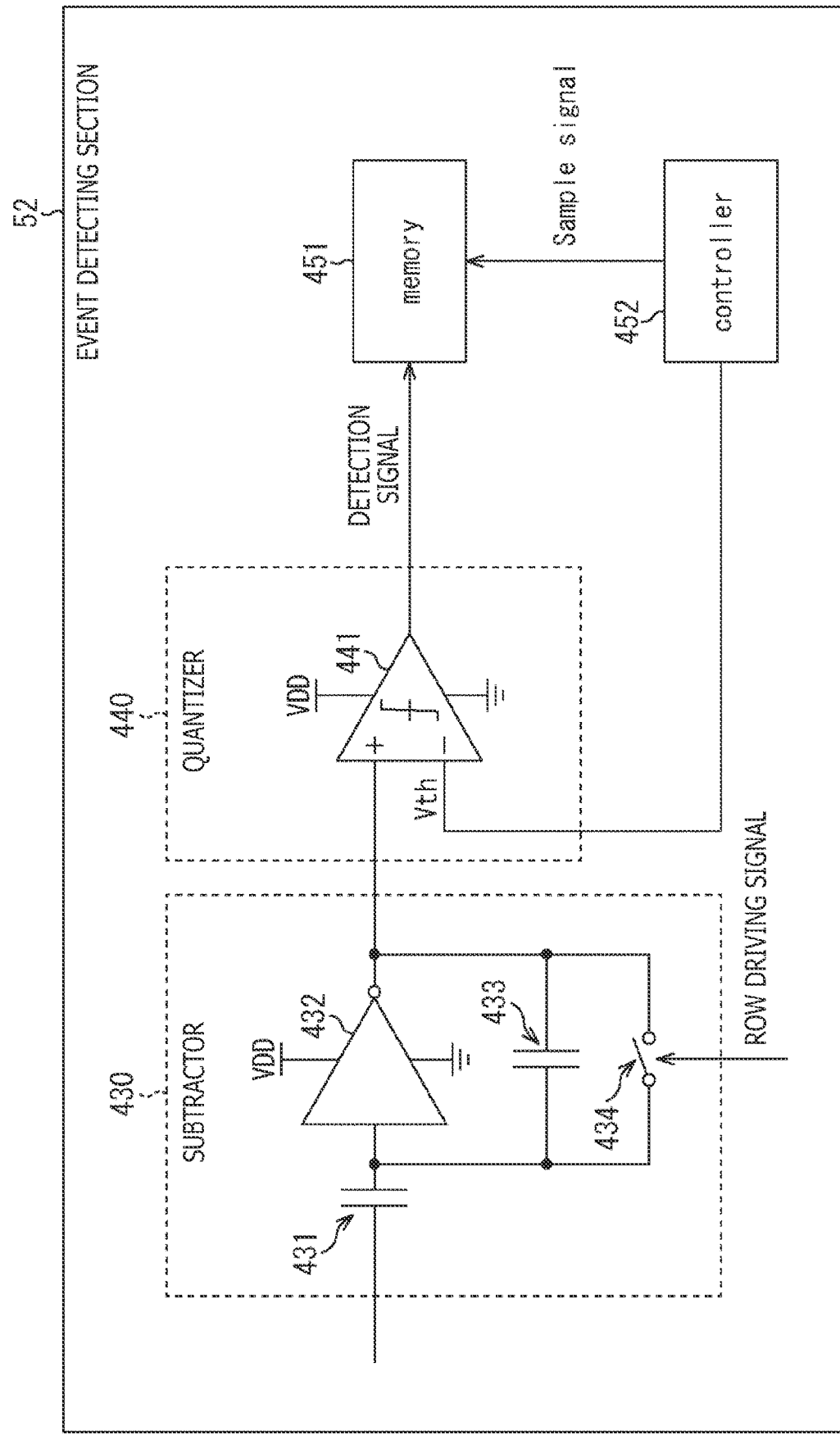
FIG. 31 is a diagram illustrating another configuration example of the event detecting section 52.

FIG. 31 is a diagram illustrating another configuration example of the event detecting section 52.

In FIG. 31, the event detecting section 52 includes a subtractor 430, a quantizer 440, a memory 451, and a controller 452. The subtractor 430 and the quantizer 440 correspond to the subtraction section 83 and the quantization section 84, respectively.

Note that, in FIG. 31, the event detecting section 52 further includes blocks corresponding to the current-voltage converting section 81 and the buffer 82, but the illustrations of the blocks are omitted in FIG. 31.

The subtractor 430 includes a capacitor 431, an operational amplifier 432, a capacitor 433, and a switch 434. The capacitor 431, the operational amplifier 432, the capacitor 433, and the switch 434 correspond to the capacitor 101, the operational amplifier 102, the capacitor 103, and the switch 104, respectively.

The quantizer 440 includes a comparator 441. The comparator 441 corresponds to the comparator 111.

The comparator 441 compares a voltage signal (difference signal) from the subtractor 430 with the predetermined threshold voltage Vth applied to the inverting input terminal (−). The comparator 441 outputs a signal indicating the comparison result, as a detection signal (quantized value).

The voltage signal from the subtractor 430 may be input to the input terminal (−) of the comparator 441, and the predetermined threshold voltage Vth may be input to the input terminal (+) of the comparator 441.

The controller 452 supplies the predetermined threshold voltage Vth applied to the inverting input terminal (−) of the comparator 441. The threshold voltage Vth which is supplied may be changed in a time-division manner. For example, the controller 452 supplies a threshold voltage Vth1 corresponding to ON events (for example, positive changes in photocurrent) and a threshold voltage Vth2 corresponding to OFF events (for example, negative changes in photocurrent) at different timings to allow the single comparator to detect a plurality of types of address events (events).

The memory 451 accumulates output from the comparator 441 on the basis of Sample signals supplied from the controller 452. The memory 451 may be a sampling circuit, such as a switch, plastic, or capacitor, or a digital memory circuit, such as a latch or flip-flop. For example, the memory 451 may hold, in a period in which the threshold voltage Vth2 corresponding to OFF events is supplied to the inverting input terminal (−) of the comparator 441, the result of comparison by the comparator 441 using the threshold voltage Vth1 corresponding to ON events. Note that, the memory 451 may be omitted, may be provided inside the pixel (pixel block 41), or may be provided outside the pixel.

<Scan Type>

The sensor chip 10 is the asynchronous imaging device configured to read out events by the asynchronous readout system. However, the event readout system is not limited to the asynchronous readout system and may be the synchronous readout system. An imaging device to which the synchronous readout system is applied is a scan type imaging device that is the same as a general imaging device configured to perform imaging at a predetermined frame rate.

Figure 32:
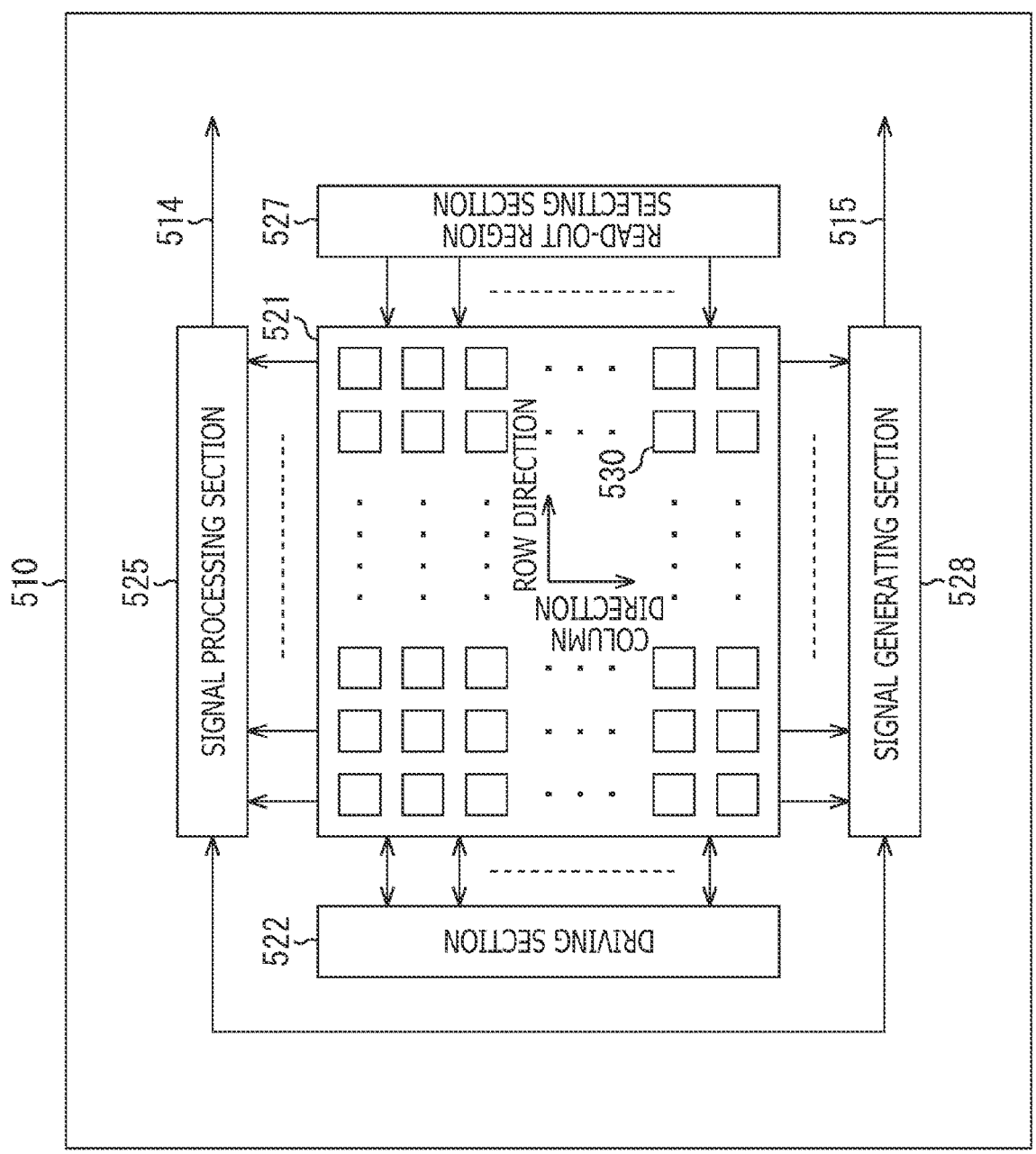
FIG. 32 is a block diagram illustrating a configuration example of a scan-type imaging device.

FIG. 32 is a block diagram illustrating a configuration example of a scan type imaging device.

As illustrated in FIG. 32, an imaging device 510 includes a pixel array section 521, a driving section 522, a signal processing section 525, a read-out region selecting section 527, and a signal generating section 528.

The pixel array section 521 includes a plurality of pixels 530. The plurality of pixels 530 each output an output signal in response to a selection signal from the read-out region selecting section 527. The plurality of pixels 530 can each include an in-pixel quantizer as illustrated in FIG. 31, for example. The plurality of pixels 530 output output signals corresponding to the amounts of change in light intensity. The plurality of pixels 530 may be two-dimensionally disposed in a matrix as illustrated in FIG. 32.

The driving section 522 drives the plurality of pixels 530, so that the pixels 530 output pixel signals generated in the pixels 530 to the signal processing section 525 through an output line 514. Note that, the driving section 522 and the signal processing section 525 are circuit sections for acquiring grayscale information. Thus, in a case where only event information (event data) is acquired, the driving section 522 and the signal processing section 525 may be omitted.

The read-out region selecting section 527 selects some of the plurality of pixels 530 included in the pixel array section 521. For example, the read-out region selecting section 527 selects one or a plurality of rows included in the two-dimensional matrix structure corresponding to the pixel array section 521. The read-out region selecting section 527 sequentially selects one or a plurality of rows on the basis of a cycle set in advance. Further, the read-out region selecting section 527 may determine a selection region on the basis of requests from the pixels 530 in the pixel array section 521.

The signal generating section 528 generates, on the basis of output signals of the pixels 530 selected by the read-out region selecting section 527, event signals corresponding to active pixels in which events have been detected of the selected pixels 530. The events mean an event that the intensity of light changes. The active pixels mean the pixel 530 in which the amount of change in light intensity corresponding to an output signal exceeds or falls below a threshold set in advance. For example, the signal generating section 528 compares output signals from the pixels 530 with a reference signal, and detects, as an active pixel, a pixel that outputs an output signal larger or smaller than the reference signal. The signal generating section 528 generates an event signal (event data) corresponding to the active pixel.

The signal generating section 528 can include, for example, a column selecting circuit configured to arbitrate signals input to the signal generating section 528. Further, the signal generating section 528 can output not only information regarding active pixels in which events have been detected, but also information regarding non-active pixels in which no event has been detected.

The signal generating section 528 outputs, through an output line 515, address information and timestamp information (for example, (X, Y, T)) regarding the active pixels in which the events have been detected. However, the data that is output from the signal generating section 528 may not only be the address information and the timestamp information, but also information in a frame format (for example, (0, 0, 1, 0, . . . )).

Application Example to Moving Body

The technology according to the present disclosure (present technology) is applicable to various products. For example, the technology according to the present disclosure may be realized as a device that is installed on any kind of moving bodies, for example, vehicles, electric vehicles, hybrid electric vehicles, motorcycles, bicycles, personal mobilities, airplanes, drones, ships, and robots.

FIG. 33 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 33, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 33, an audio speaker 12061, a display section 12062, and an instrument panel 12063 are illustrated as the output device. The display section 12062 may, for example, include at least one of an on-board display and a head-up display.

Figure 34:
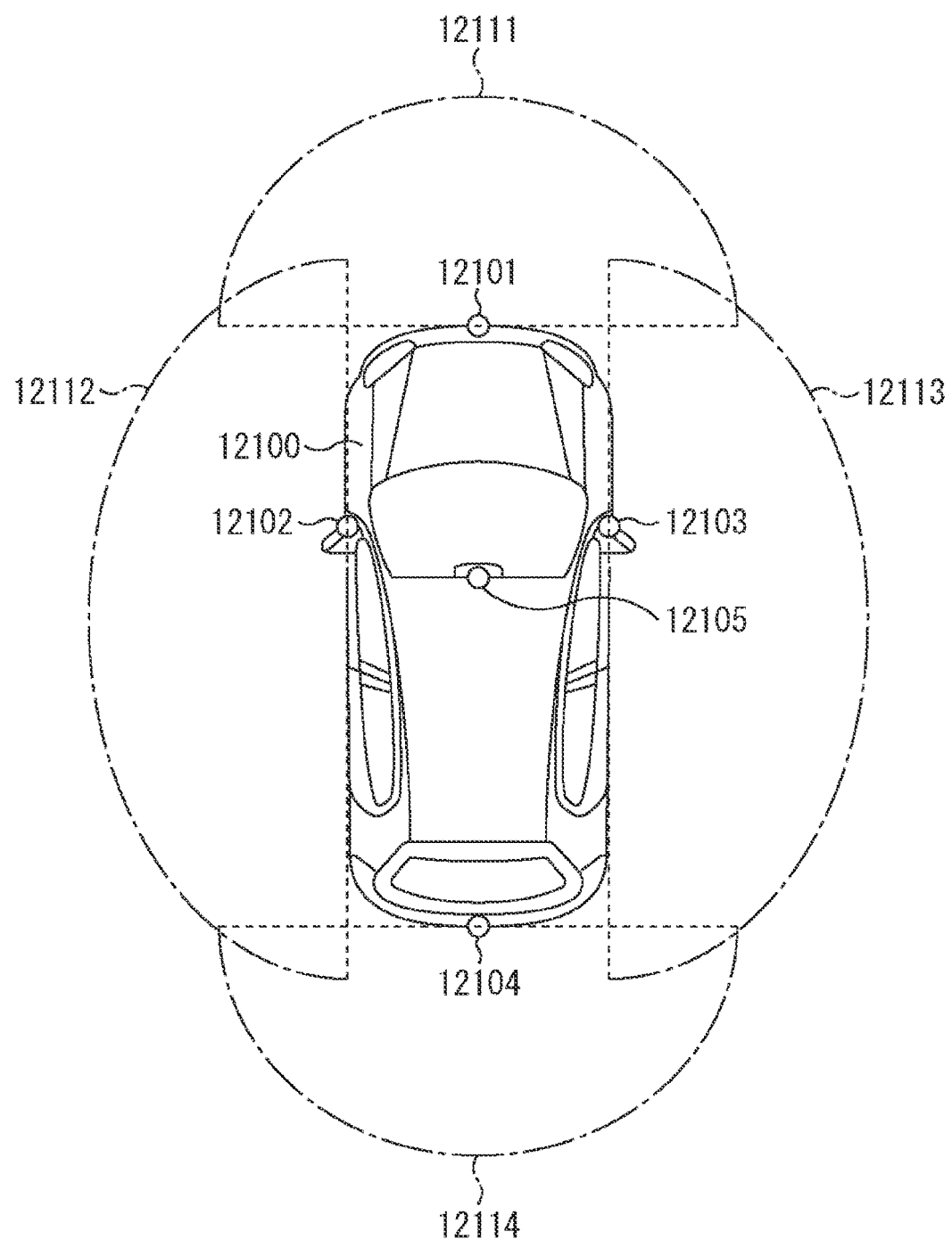
FIG. 34 is a diagram of assistance in explaining an example of installation positions of an outside-vehicle information detecting section and an imaging section.

FIG. 34 is a diagram depicting an example of the installation position of the imaging section 12031.

In FIG. 34, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 34 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure is applicable has been described above. The technology according to the present disclosure is applicable to the imaging section 12031 among the above-mentioned configurations. Specifically, the sensor chip 200 of FIG. 14 is applicable to the imaging section 12031. The imaging section 12031 to which the technology according to the present disclosure has been applied flexibly acquires event data and performs data processing on the event data, thereby being capable of providing appropriate driving assistance.

Note that, the embodiments of the present technology are not limited to the above-mentioned embodiment, and various modifications can be made without departing from the gist of the present technology.

Further, the effects described herein are only exemplary and not limited, and other effects may be provided.

Note that, the present technology can also take the following configurations.

<1>

A sensor including:

a pixel block including one or more pixels each configured to receive light and perform photoelectric conversion to generate an electrical signal, and an event detecting section configured to detect an event that is a change in electrical signal of each of the pixels; and a connection control section configured to switch connections between a plurality of the pixel blocks.

<2>

The sensor according to Item <1>, in which the connection control section connects the plurality of pixel blocks to combine photocurrents from the pixels in the plurality of pixel blocks.

<3>

The sensor according to Item <2>, in which the event detecting section includes a current-voltage converting section configured to convert each of the photocurrents to a voltage with a FET (Field Effect Transistor) through which the photocurrents flow, and the connection control section switches connections between sources of the FETs of the plurality of pixel blocks.

<4>

The sensor according to Item <3>, in which the connection control section turns on or off operation of the current-voltage converting section.

<5>

The sensor according to any one of Items <1> to <4>, in which the connection control section connects the plurality of pixel blocks to combine voltages corresponding to photocurrents from the pixels in the plurality of pixel blocks.

<6>

The sensor according to Item <5>, in which the event detecting section includes the current-voltage converting section configured to convert each of the photocurrents to a voltage with the FET (Field Effect Transistor) through which the photocurrents flow, and the connection control section switches connections between gates of the FETs of the plurality of pixel blocks.

<7>

The sensor according to any one of Items <1> to <4>, in which the event detecting section includes a current-voltage converting section configured to convert each of photocurrents from the pixels to a voltage with the FET (Field Effect Transistor) through which the photocurrents flow, and a subtraction section configured to obtain, with a first capacitor and a second capacitor, a difference signal corresponding to a difference between voltages at different timings corresponding to the photocurrents, and the connection control section switches connections between a connecting point between the first capacitor and the second capacitor of one of the plurality of pixel blocks and a gate of the FET of another of the pixel blocks, through a third capacitor.

<8>

The sensor according to any one of Items <1> to <7>, in which the event detecting section includes the current-voltage converting section configured to convert each of photocurrents from the pixels to a voltage, the subtraction section configured to obtain, with the first capacitor and the second capacitor, the difference signal corresponding to the difference between voltages at different timings corresponding to the photocurrents, and a quantization section configured to quantize the difference signal and output a quantized value obtained by the quantization, as event data indicating occurrence of an event, and the sensor further includes a calculation section configured to perform, on the event data from each of the plurality of pixel blocks, calculation based on an operating mode of the connection control section, and to output a result of the calculation.

<9>

The sensor according to any one of Items <1> to <8>, further including:

a transistor configured to transfer charges of the pixels.

<10>

A control method including:

a step of controlling a sensor, the sensor including a pixel block including one or more pixels each configured to receive light and perform photoelectric conversion to generate an electrical signal, and an event detecting section configured to detect an event that is a change in electrical signal of each of the pixels, in which the sensor switches connections between a plurality of the pixel blocks.

REFERENCE SIGNS LIST

- 10: Sensor chip
- 11: Sensor die
- 12: Logic die
- 21: Sensor section
- 22: Logic section
- 31: Pixel array section
- 32: Driving section
- 33: Arbiter
- 34: AD conversion section
- 35: Output section
- 41, 41A, 41B: Pixel block
- 42: Connection control section
- 51, 51A, 51B: Pixel
- 52, 52A, 52B: Event detecting section
- 53: Pixel signal generating section
- 60: Node
- 61: Photoelectric conversion element
- 62, 63: Transfer transistor
- 71: Reset transistor
- 72: Amplification transistor
- 73: Selection transistor
- 74: FD
- 81: Current-voltage converting section
- 82: Buffer
- 83: Subtraction section
- 84: Quantization section
- 85: Transfer section
- 91 to 93: Transistor
- 101: Capacitor
- 102: Operational amplifier
- 103: Capacitor
- 104: Switch
- 111, 112: Comparator
- 113: Output section
- 200: Sensor chip
- 201: Sensor section
- 211: Pixel array section
- 231: FET
- 232: Calculation section
- 234: FET
- 235: Capacitor

The invention claimed is:

1. A sensor comprising:

a plurality of pixel blocks, each pixel block including one or more pixels each configured to receive light and perform photoelectric conversion to generate an electrical signal, and an event detecting section configured to detect an event that is a change in electrical signal of any of the pixels; and a connection control section configured to switch connections between the plurality of the pixel blocks, wherein the connection control section connects the plurality of pixel blocks to combine photocurrents from the pixels in the plurality of pixel blocks, and the event detecting section includes a current-voltage converting section configured to convert each of the photocurrents to a voltage with a FET (Field Effect Transistor) through which the photocurrents flow, and the connection control section switches connections between sources of the FETs of the plurality of pixel blocks.

2. The sensor according to claim 1, wherein the connection control section turns on or off operation of the current-voltage converting section.

3. The sensor according to claim 1, further comprising:

a transistor configured to transfer charges of the pixels.

4. A sensor comprising: a plurality of pixel blocks, each pixel block including one or more pixels each configured to receive light and perform photoelectric conversion to generate an electrical signal, and an event detecting section configured to detect an event that is a change in electrical signal of any of the pixels; and a connection control section configured to switch connections between the plurality of the pixel blocks, wherein the connection control section connects the plurality of pixel blocks to combine voltages corresponding to photocurrents from the pixels in the plurality of pixel blocks, the event detecting section includes a current-voltage converting section configured to convert each of the photocurrents to a voltage with a FET (Field Effect Transistor) through which the photocurrents flow, and the connection control section switches connections between gates of the FETs of the plurality of pixel blocks.

5. A sensor comprising:

a plurality of pixel blocks, each pixel block including one or more pixels each configured to receive light and perform photoelectric conversion to generate an electrical signal, and an event detecting section configured to detect an event that is a change in electrical signal of any of the pixels; and a connection control section configured to switch connections between the plurality of the pixel blocks, wherein the event detecting section includes a current-voltage converting section configured to convert each of photocurrents from the pixels to a voltage with a FET (Field Effect Transistor) through which the photocurrents flow, and a subtraction section configured to obtain, with a first capacitor and a second capacitor, a difference signal corresponding to a difference between voltages at different timings corresponding to the photocurrents, and wherein the connection control section switches connections between a connecting point between the first capacitor and the second capacitor of one of the plurality of pixel blocks and a gate of the FET of another of the pixel blocks, through a third capacitor.

6. A sensor comprising:

a plurality of pixel blocks, each pixel block including one or more pixels each configured to receive light and perform photoelectric conversion to generate an electrical signal, and an event detecting section configured to detect an event that is a change in electrical signal of any of the pixels; and a connection control section configured to switch connections between the plurality of the pixel blocks, wherein the event detecting section includes a current-voltage converting section configured to convert each of photocurrents from the pixels to a voltage, a subtraction section configured to obtain, with a first capacitor and a second capacitor, a difference signal corresponding to a difference between voltages at different timings corresponding to the photocurrents, and a quantization section configured to quantize the difference signal and output a quantized value obtained by the quantization, as event data indicating occurrence of an event, and wherein the sensor further includes a calculation section configured to perform, on the event data from each of the plurality of pixel blocks, calculation based on an operating mode of the connection control section, and to output a result of the calculation.

7. A method for controlling a sensor, the sensor including a plurality of pixel blocks, each pixel block including one or more pixels each configured to receive light and perform photoelectric conversion to generate an electrical signal, the method comprising:

detecting, by an event detecting section, an event that is a change in electrical signal of any of the pixels; and connecting, by a connection control section, the plurality of pixel blocks to combine photocurrents from the pixels in the plurality of pixel blocks, wherein the event detecting section includes a current-voltage converting section configured to convert each of the photocurrents to a voltage with a FET (Field Effect Transistor) through which the photocurrents flow, and the connection control section switches connections between sources of the FETs of the plurality of pixel blocks.

* * * * *